(12) United States Patent
Wang et al.

(10) Patent No.: US 11,113,599 B2
(45) Date of Patent: Sep. 7, 2021

(54) IMAGE CAPTIONING UTILIZING SEMANTIC TEXT MODELING AND ADVERSARIAL LEARNING

(71) Applicant: Adobe Inc., San Jose, CA (US)

(72) Inventors: Zhaowen Wang, San Jose, CA (US); Shuai Tang, La Jolla, CA (US); Hailin Jin, San Jose, CA (US); Chen Fang, Hanover, NH (US)

(73) Assignee: Adobe Inc., San Jose, CA (US)

( * ) Notice: Subject to any disclaimer, the term of this patent is extended or adjusted under 35 U.S.C. 154(b) by 1113 days.

(21) Appl. No.: 15/630,604

(22) Filed: Jun. 22, 2017

(65) Prior Publication Data

US 2018/0373979 A1    Dec. 27, 2018

(51) Int. Cl.
*G06N 3/08* (2006.01)
*G06K 9/00* (2006.01)
*G06N 20/00* (2019.01)
*G06N 3/04* (2006.01)
*G06K 9/62* (2006.01)

(52) U.S. Cl.
CPC .......... *G06N 3/08* (2013.01); *G06K 9/00664* (2013.01); *G06K 9/00671* (2013.01); *G06K 9/6262* (2013.01); *G06K 9/6274* (2013.01); *G06N 3/0445* (2013.01); *G06N 3/0454* (2013.01); *G06N 3/088* (2013.01); *G06N 20/00* (2019.01)

(58) Field of Classification Search
CPC .............................. G06K 9/00664; G06N 3/08
See application file for complete search history.

(56) References Cited

U.S. PATENT DOCUMENTS

| | | | |
|---|---|---|---|
| 2017/0011279 A1* | 1/2017 | Soldevila | G06N 3/04 |
| 2017/0147910 A1* | 5/2017 | Mao | G06N 3/0445 |
| 2017/0200066 A1* | 7/2017 | Wang | G06N 3/08 |
| 2018/0129937 A1* | 5/2018 | Bradbury | G06N 3/0445 |
| 2018/0225519 A1* | 8/2018 | Chen | G06K 9/4628 |
| 2018/0268548 A1* | 9/2018 | Lin | G06K 9/6274 |

OTHER PUBLICATIONS

Kanezaki et al, "Hard Negative Classes for Multiple Object Detection", 2014, IEEE International Conference on Robotics & Automation (ICRA), pp. 3066-3073. (Year: 2014).*

(Continued)

*Primary Examiner* — Michael J Huntley
*Assistant Examiner* — Clint Mullinax
(74) *Attorney, Agent, or Firm* — Keller Jolley Preece

(57) ABSTRACT

The present disclosure includes methods and systems for generating captions for digital images. In particular, the disclosed systems and methods can train an image encoder neural network and a sentence decoder neural network to generate a caption from an input digital image. For instance, in one or more embodiments, the disclosed systems and methods train an image encoder neural network (e.g., a character-level convolutional neural network) utilizing a semantic similarity constraint, training images, and training captions. Moreover, the disclosed systems and methods can train a sentence decoder neural network (e.g., a character-level recurrent neural network) utilizing training sentences and an adversarial classifier.

20 Claims, 12 Drawing Sheets

(56) References Cited

OTHER PUBLICATIONS

Vosoughi et al, "Tweet2Vec: Learning Tweet Embeddings Using Character-level CNN-LSTM Encoder-Decoder", 2016, Proceedings of the 39th International ACM SIGIR conference on Research and Development in Information Retrieval, pp. 1041-1044. (Year: 2016).*
Shetty et al, "Speaking the Same Language: Matching Machine to Human Captions by Adversarial Training", 2017, arXiv: 1703.10476v1, pp. 1-16. (Year: 2017).*
Karpathy et al, "Deep Visual-Semantic Alignments for Generating Image Descriptions", 2015, Proceeding of the IEEE Conference on Computer Vision and Pattern Recognition, pp. 3128-3137. (Year: 2015).*
Makhzani, A., Shlens, J., Jaitly, N., & Goodfellow, I. (2015). Adversarial autoencoders. arXiv preprint arXiv:1511.05644.
Bowman, S. R., Vilnis, L., Vinyals, O., Dai, A. M., Jozefowicz, R., & Bengio, S. (2015). Generating sentences from a continuous space. arXiv preprint arXiv:1511.06349.
Salimans, T., Goodfellow, I., Zaremba, W., Cheung, V., Radford, A., & Chen, X. (2016). Improved Techniques for Training GANs. arXiv preprint arXiv:1606.03498.
He, K., Zhang, X., Ren, S., & Sun, J. (2016). Identity mappings in deep residual networks. arXiv preprint arXiv:1603.05027.
Zhu, Y., Kiros, R., Zemel, R., Salakhutdinov, R., Urtasun, R., Torralba, A., & Fidler, S. (2015). Aligning books and movies: Towards story-like visual explanations by watching movies and reading books. In Proceedings of the IEEE International Conference on Computer Vision (pp. 19-27).
Lin, T. Y., Maire, M., Belongie, S., Hays, J., Perona, P., Ramanan, D., . . . & Zitnick, C. L. (Sep. 2014). Microsoft coco: Common objects in context. In European Conference on Computer Vision (pp. 740-755). Springer International Publishing.
Zhang, X., Zhao, J., & LeCun, Y. (2015). Character-level convolutional networks for text classification. In Advances in Neural Information Processing Systems (pp. 649-657).
Hochreiter, S., & Schmidhuber, J. (1997). Long short-term memory. Neural computation, 9(8), 1735-1780.
Goodfellow, I., Pouget-Abadie, J., Mirza, M., Xu, B., Warde-Farley, D., Ozair, S., . . . & Bengio, Y. (2014). Generative Adversarial Nets. In Advances in Neural Information Processing Systems (pp. 2672-2680).
Junyoung Chung, Caglar Gulcehre, KyungHyun Cho, and Yoshua Bengio. Empirical evaluation of gated recurrent neural networks on sequence modeling. arXiv preprint arXiv:1412.3555, 2014.
R. Collobert, K. Kavukcuoglu, and C. Farabet. Torch7: A matlab-like environment for machine learning. In BigLearn, NIPS Workshop, 2011.
Jeffrey Donahue, Lisa Anne Hendricks, Sergio Guadarrama, Marcus Rohrbach, Subhashini Venugopalan, Kate Saenko, and Trevor Darrell. Long-term recurrent convolutional networks for visual recognition and description. In Proceedings of the IEEE Conference on Computer Vision and Pattern Recognition, pp. 2625-2634, 2015.
Sergey Ioffe and Christian Szegedy. Batch normalization: Accelerating deep network training by reducing internal covariate shift. arXiv preprint arXiv:1502.03167, 2015.
Diederik Kingma and Jimmy Ba. Adam: A method for stochastic optimization. arXiv preprint arXiv:1412.6980, 2014.
Ryan Kiros, Ruslan Salakhutdinov, and Richard S Zemel. Multimodal neural language models. In ICML, vol. 14, pp. 595-603, 2014.
Ryan Kiros, Yukun Zhu, Ruslan R Salakhutdinov, Richard Zemel, Raquel Urtasun, Antonio Torralba, and Sanja Fidler. Skip-thought vectors. In Advances in neural information processing systems, 2015.
Jason Lee, Kyunghyun Cho, and Thomas Hofmann. Fully character-level neural machine translation without explicit segmentation. arXiv preprint arXiv:1610.03017, 2016.
Minh-Thang Luong and Christopher D Manning. Achieving open vocabulary neural machine translation with hybrid word-character models. arXiv preprint arXiv:1604.00788, 2016.
Christopher D. Manning, Mihai Surdeanu, John Bauer, Jenny Finkel, Steven J. Bethard, and David McClosky. The Stanford CoreNLP natural language processing toolkit. In Association for Computational Linguistics (ACL) System Demonstrations, pp. 55-60, 2014. URL http://www.aclweb.org/anthology/P/P14/P14-5010.
Nitish Srivastava, Geoffrey E Hinton, Alex Krizhevsky, Ilya Sutskever, and Ruslan Salakhutdinov. Dropout: a simple way to prevent neural networks from overfitting. Journal of Machine Learning Research, 15(1):1929-1958, 2014.
Lantao Yu, Weinan Zhang, Jun Wang, and Yong Yu. Seqgan: Sequence generative adversarial nets with policy gradient. arXiv preprint arXiv:1609.05473, 2016.

* cited by examiner

IMAGE CAPTIONING UTILIZING SEMANTIC TEXT MODELING AND ADVERSARIAL LEARNING

BACKGROUND

Recent years have seen a significant increase in the use of digital images and videos by individuals and businesses. Indeed, whether for entertainment, advertising, educational, or other purposes, individuals and businesses increasingly generate and utilize digital images. For example, in today's technological environment, an individual may capture and share digital images with friends over a social network, receive digital image advertisements, or review digital images as part of reading digital news.

As the prevalence of digital images and videos has increased, the need for digital image captioning has also increased. Digital image captioning is the process of generating a natural language description for a digital image. Digital image captioning is used in a variety of applications to provide an indication of content of one or more digital images. For example, image captioning can help visually impaired individuals understand the content of a digital image where they are unable to see the digital image. Similarly, image captioning can assist in identifying, labeling, or searching for digital images.

To address this need, developers have created systems that automatically generate captions describing the contents of digital images. For example, some conventional systems utilize deep learning techniques that directly "translate" an image into a caption. Such conventional systems, however, have a number of significant shortcomings. For example, conventional systems utilizing deep learning techniques often require an enormous amount of training data. In particular, to learn to convert unseen images into new captions, conventional captioning systems can require large volumes of training images where each training image has a corresponding description. Such large volumes of training data are difficult and expensive to obtain.

Moreover, conventional systems also struggle to generate accurate captions corresponding to new images. For example, conventional systems tend to memorize and repeat information from training data rather than generating captions appropriate to the contents of a previously unanalyzed digital image. To illustrate, conventional systems often copy and paste phrases (or even entire sentences) from training data when generating descriptions for a new digital image, even though the semantics of the copied training data do not match the digital image contents or reflect plausible linguistic expressions. Accordingly, although conventional systems can generate descriptions, the resulting captions often fail to accurately reflect digital image contents through comprehensible sentences.

These and other problems exist with regard to digital image captioning.

BRIEF SUMMARY

One or more embodiments of the present disclosure provide benefits and/or solve one or more of the foregoing or other problems in the art with systems and methods that generate captions for digital images utilizing an image encoder neural network and a sentence decoder neural network. In particular, the disclosed systems and methods train an image encoder neural network to generate feature vectors from input digital images. Moreover, the disclosed systems and methods train a sentence decoder neural network to transform the generated feature vectors into captions that accurately reflect the contents of an input digital image.

In one or more embodiments, the disclosed systems and methods train the image encoder neural network and the sentence decoder neural network by utilizing an adversarial classifier and/or a semantic similarity constraint. For instance, the disclosed systems and methods can train an image encoder neural network by applying a semantic similarity constraint to both training images and training captions. Utilizing this approach assists the image encoder neural network to generate feature vectors that accurately reflect the contents of the input digital image in a semantic space. Moreover, the disclosed systems and methods can train a sentence decoder neural network by applying an adversarial classifier that constrains generated captions to a distribution of plausible expressions. Utilizing this approach assists the sentence decoder neural network to generate captions that reflect plausible sentences while not being not direct copies of training data.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described in relation to the accompanying drawings in which.

DETAILED DESCRIPTION

Figure 1A:
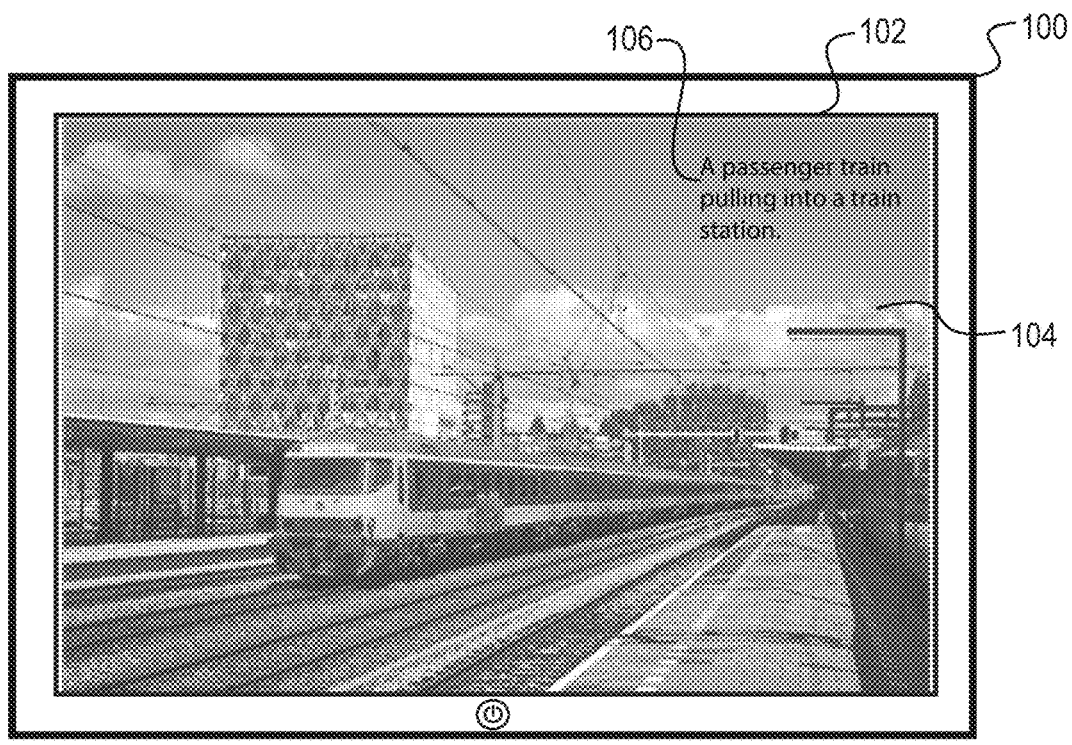
FIGS. 1A-1B illustrate a computing device providing a digital image and corresponding caption in accordance with one or more embodiments.

One or more embodiments of the present disclosure include a digital image captioning system that trains an image encoder neural network and a sentence decoder neural network to generate captions for input digital images. For example, in one or more embodiments, the digital image captioning system trains an image encoder neural network to generate, from digital images, feature vectors in a semantic space. The digital image captioning system also trains a sentence decoder neural network to generate captions based on feature vectors in the semantic space. The digital image captioning system then utilizes the trained image encoder neural network and the trained sentence decoder neural network to generate captions for input digital images.

More specifically, in one or more embodiments, the digital image captioning system trains an image encoder neural network and a sentence decoder neural network based on an adversarial classifier and a semantic similarity constraint. Specifically, in one or more embodiments, the digital image captioning system applies an adversarial loss generated by an adversarial classifier to constrain the model to a semantic space (i.e., a semantic space where samples can be decoded as plausible linguistic expressions). The digital image captioning system then draws from the semantic space to generate plausible captions for input digital images. Moreover, the digital image captioning system applies a semantic similarity constraint to train the model to more accurately learn relationships between representations of training images and training captions. In particular, in one or more embodiments, the digital image captioning system applies a semantic similarity constraint that minimizes the differences between training image representations and training caption representations in the semantic space.

In one or more embodiments, the digital image captioning system trains the sentence decoder neural network in conjunction with a sentence encoder neural network and an adversarial classifier. Together, a sentence encoder neural network and sentence decoder neural network are referred to herein as an "auto-encoder." Moreover, a sentence encoder neural network and sentence decoder neural network utilized in conjunction with an adversarial classifier are referred to herein as an "adversarial auto-encoder."

The digital image captioning system can utilize a plurality of training sentences to train an adversarial auto-encoder. Specifically, in one or more embodiments, the digital image captioning system utilizes the training sentences and the adversarial classifier to determine an adversarial loss and reconstruction loss resulting from the sentence encoder neural network and the sentence decoder neural network. The digital image captioning system then trains the sentence encoder neural network and the sentence decoder neural network to predict sentences from the training sentences based on the adversarial loss and the reconstruction loss.

As just mentioned, the digital image captioning system can utilize an adversarial classifier as part of an adversarial auto-encoder. As described in greater detail below, an adversarial classifier is a binary classifier that can be utilized to distinguish positive samples from negative samples. The digital image captioning system can utilize an adversarial classifier to distinguish between positive samples (i.e., samples from a prior distribution in a semantic space) and negative samples (i.e., samples generated by the sentence encoder neural network). By minimizing the difference between the samples drawn from the prior distribution and samples generated by the sentence encoder neural network, the digital image captioning system can constrain the resulting model to a dense semantic space that can be decoded into plausible sentences.

As mentioned above, in one or more embodiments, the digital image captioning system also trains an image encoder neural network utilizing a semantic similarity constraint. In particular, in one or more embodiments, the digital image captioning system jointly trains the image encoder neural network in conjunction with a sentence encoder neural network and sentence decoder neural network based on the semantic similarity constraint.

To illustrate, the digital image captioning system determines a semantic similarity loss by applying the image encoder neural network to the training images, applying the sentence encoder neural network to the corresponding training sentences, and comparing the resulting feature vectors. Moreover, the digital image captioning system determines a reconstruction loss resulting from application of the sentence encoder neural network and the sentence decoder neural network to the training sentences. The digital image captioning system jointly trains the sentence encoder neural network, the sentence decoder neural network, and the image encoder network by utilizing the semantic similarity loss and the reconstruction loss.

Moreover, in one or more embodiments, the digital image captioning system applies the semantic similarity constraint to multiple different training captions for each training image. In particular, the digital image captioning system can generate a feature vector for a training image and generate feature vectors for a plurality of training captions describing the training image. The digital image captioning system then minimizes the difference between the feature vector for the training image and the feature vectors for the plurality of corresponding training captions. For example, in one or more embodiments, the digital image captioning system utilizes training images where each training image has five training captions and applies the semantic similarity constraint to ensure similar semantic meaning between feature vectors for each training image and feature vectors for corresponding training captions.

In this manner, the digital image captioning system can ensure that different training captions for any given image have similar semantic meaning within the model and that the model generates a semantic meaning for the given image that is similar to the semantic meaning of multiple different training captions. Thus, two images of similar content will be closely related (in terms of semantic meaning) and different captions for an image will also be closely related. This helps to ensure that the model generates captions that are semantically similar to content displayed in a digital image.

In summary, training the image encoder and sentence decoder based on an adversarial classifier and/or semantic similarity constraint, the digital image captioning system accurately and efficiently generates captions for input digital images. In particular, the digital image captioning system reduces the amount of training data required while increasing the accuracy of resulting captions in relation to the content of digital images. Thus, the digital image captioning system can use less processing power and less computational resources when training the system.

Furthermore, by applying a semantic similarity constraint in training, the digital image captioning system can better learn relationships between image representations and sentence representations. For instance, by utilizing a semantic similarity constraint in training, the digital image captioning system can encourage captions that accurately reflect contents portrayed in a digital image as well as the semantic meaning of what is portrayed in the digital image.

Furthermore, by utilizing an adversarial loss, the digital image captioning system generates more accurate captions by constraining feature vectors to a semantic space. In particular, the digital image captioning system generates feature vectors within a dense semantic space that can be decoded as one or more plausible sentences. Accordingly, the digital image captioning system generates descriptions that are not only semantically similar to the contents of digital images, but that also reflect plausible, linguistically appropriate expressions. Thus, the digital image captioning system avoids copying and repeating phrases or sentences from training data. Rather, the digital image captioning system generates descriptions that are semantically similar to the contents of digital images, but stylistically different than training captions.

Figure 1B:
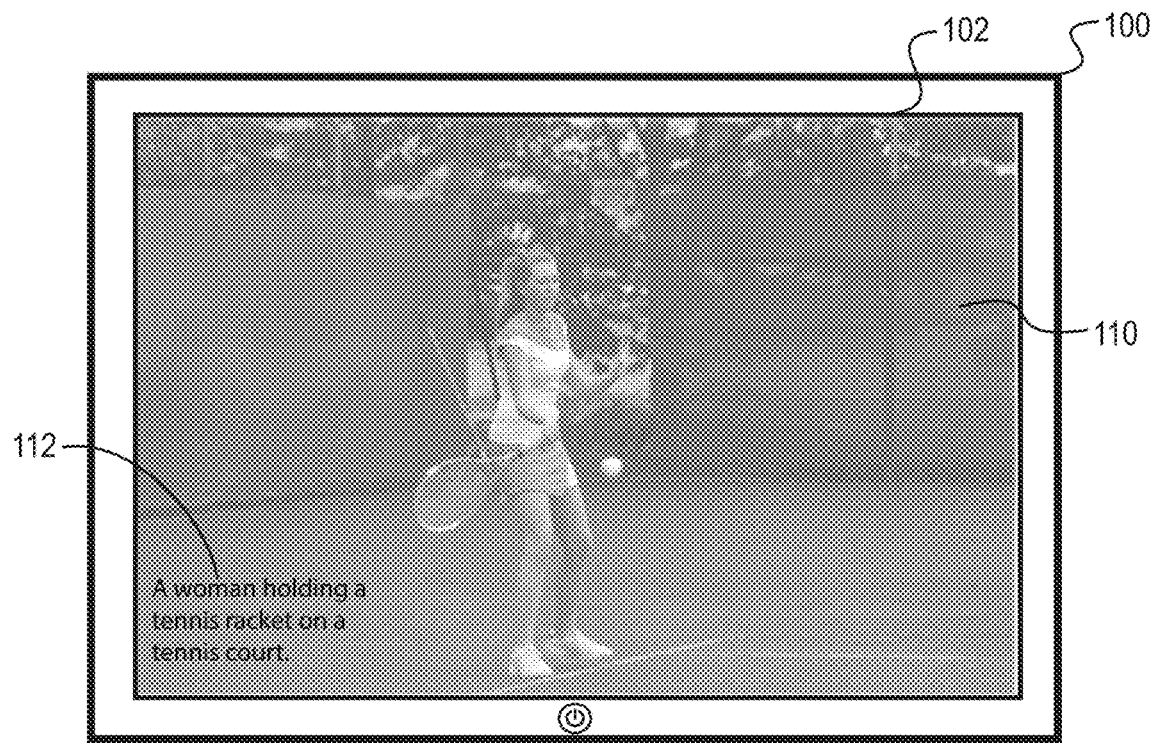

Turning now to FIGS. 1A-1B, additional detail will be provided regarding generating captions for input digital images in accordance with one or more embodiments of the digital image captioning system. In particular, FIGS. 1A-1B illustrate a computing device 100 with a display screen 102 displaying digital images 104, 110. As illustrated, the digital image captioning system analyzes the digital images 104, 110 and generates the captions 106, 112.

As used herein, the term "digital image" refers to any digital symbol, picture, icon, or illustration. For example, the term "digital image" includes digital files with the following, or other, file extensions: JPG, TIFF, BMP, PNG, RAW, or PDF. The term "digital image" also includes one or more images (e.g., frames) in a digital video. Similarly, the term "input digital image" refers to a digital image analyzed by the digital image captioning system for generating a caption. Thus, in relation to FIGS. 1A-1B, the digital images 104, 110 are input digital images utilized to generate the captions 106, 112 (i.e., two sentences describing the contents of the digital images 104, 110).

Moreover, as used herein, the term "sentence" refers to a group of words. In particular, the term "sentence" includes a group of words in a language that form a coherent thought. A sentence can include a phrase, a description, a title, or a grammatically complete English sentence (e.g., a subject, verb, direct object, and/or punctuation).

As mentioned above, a sentence can also form a caption. As used herein, the term "caption" refers to a sentence corresponding to a digital image. In particular, the term "caption" refers to a sentence corresponding to contents of a digital image. For example, a caption can include a phrase, title, description, or grammatically complete English sentence describing the contents of a digital image. To illustrate, as shown in FIGS. 1A-1B, the caption 106 (i.e., "A passenger train pulling into a train station.") is a sentence describing the contents of the digital image 104, while the caption 112 (i.e., "A woman holding a tennis racket on a tennis court.") is a sentence describing the contents of the digital image 110.

In relation to the embodiment of FIGS. 1A-1B, the digital image captioning system generates the captions 106, 112 utilizing a trained image encoder neural network and a trained sentence decoder neural network. In particular, the digital image captioning system utilizes a sentence decoder neural network trained utilizing an adversarial auto-encoder that also includes a sentence encoder neural network and an adversarial classifier.

As used herein, the term "neural network" refers to a machine learning model that can be tuned (e.g., trained) based on inputs to approximate unknown functions. In particular, the term "neural network" can include a model of interconnected layers that communicate and analyze attributes at varying degrees of abstraction to learn to approximate complex functions and generate outputs based on a plurality of inputs provided to the model. For instance, the term "neural network" includes one or more machine learning algorithms. In particular, the term "neural network" includes convolutional neural networks (i.e., "CNNs"), fully convolutional neural networks (i.e., "FCNs"), or recurrent neural networks (i.e., "RCNs"). In other words, a neural network includes an algorithm that implements deep learning techniques, i.e., machine learning that utilizes a set of algorithms to attempt to model high-level abstractions in data.

Moreover, as used herein, the term "image encoder neural network" refers to a neural network that encodes a digital image. In particular, the term "image encoder neural network" includes a neural network that generates a vector (e.g., a feature vector) in a semantic space from a digital image. The term "feature vector" as used herein refers to a numerical representation of features. In particular, the term "feature vector" includes an n-dimensional vector of numerical features. For example, a feature vector includes a 500-dimensional vector of numerical features in a semantic space, where the values of the feature vector encapsulate a semantic meaning within the semantic space.

As used herein, the term "semantic space" refers to a metric space (e.g., a coordinate system) where location or distance in the metric space represents semantic similarity or meaning. In particular, the term "semantic space" includes a metric space where a smaller distance exists between feature vectors of similar semantic meaning than between feature vectors that are less similar. For example, a semantic space can include an n-dimensional metric space where any position with the metric space encapsulates a semantic meaning.

In addition, as used herein, the term "sentence encoder neural network" refers to a neural network that encodes a sentence. In particular, the term "sentence encoder neural network" includes a neural network that encodes a sentence as a vector (e.g., a feature vector) in a semantic space. Furthermore, as used herein, the term "sentence decoder neural network" refers to a neural network that decodes a sentence (or caption). In particular, the term "sentence decoder neural network" refers to a neural network that decodes a sentence (or caption) from a vector (e.g., a feature vector) in a semantic space. Additional detail regarding image encoder neural networks, sentence encoder neural networks, and sentence decoder neural networks are provided below.

In relation to FIGS. 1A-1B, the digital image captioning system applies a trained image encoder neural network to the digital images 104, 110. The trained image encoder neural network generates a feature vector corresponding to the digital image 104 in a semantic space and also generates a feature vector corresponding to the digital image 110 in the semantic space. The digital image captioning system then applies a trained sentence decoder neural network (i.e., a trained sentence decoder neural network trained as part of an adversarial auto-encoder) to the feature vector corresponding to the digital image 104 and the feature vector corresponding to the digital image 110. Applying the sentence decoder neural network results in generating the caption 106 corresponding to the digital image 104 and the caption 112 corresponding to the digital image 110.

Moreover, as shown, the digital image captioning system provides the captions 106, 112 for presentation via the computing device 100. Although FIGS. 1A-1B illustrate providing the captions 106, 112 for display, the digital image captioning system can provide the captions for presentation in a variety of different ways via the computing device 100. For example, the digital image captioning system can provide the captions 106, 112 audibly (e.g., utilize text-to-speech software so that a user of the computing device 100 can hear the captions 106, 112). Similarly, the digital image captioning system can provide the captions 106, 112 for presentation via a brail generator or other physical manifestation. Thus, as shown, the digital image captioning system can automatically generate a caption that corresponds to an input digital image and provide the caption for presentation via a computing device.

In addition to providing a caption via a computing device, the digital image captioning system can utilize generated captions in a variety of other ways. For example, the digital image captioning system can store captions corresponding to digital images and utilize the captions to search for digital images. To illustrate, the digital image captioning system can conduct a word search query by analyzing captions of digital images in a database of digital images. Similarly, the digital image captioning system can generate captions for a repository of digital images and provide the repository of digital images with the captions for display (e.g., thumbnail digital images with captions) to assist a user in searching or organizing the repository of digital images.

Figure 2:
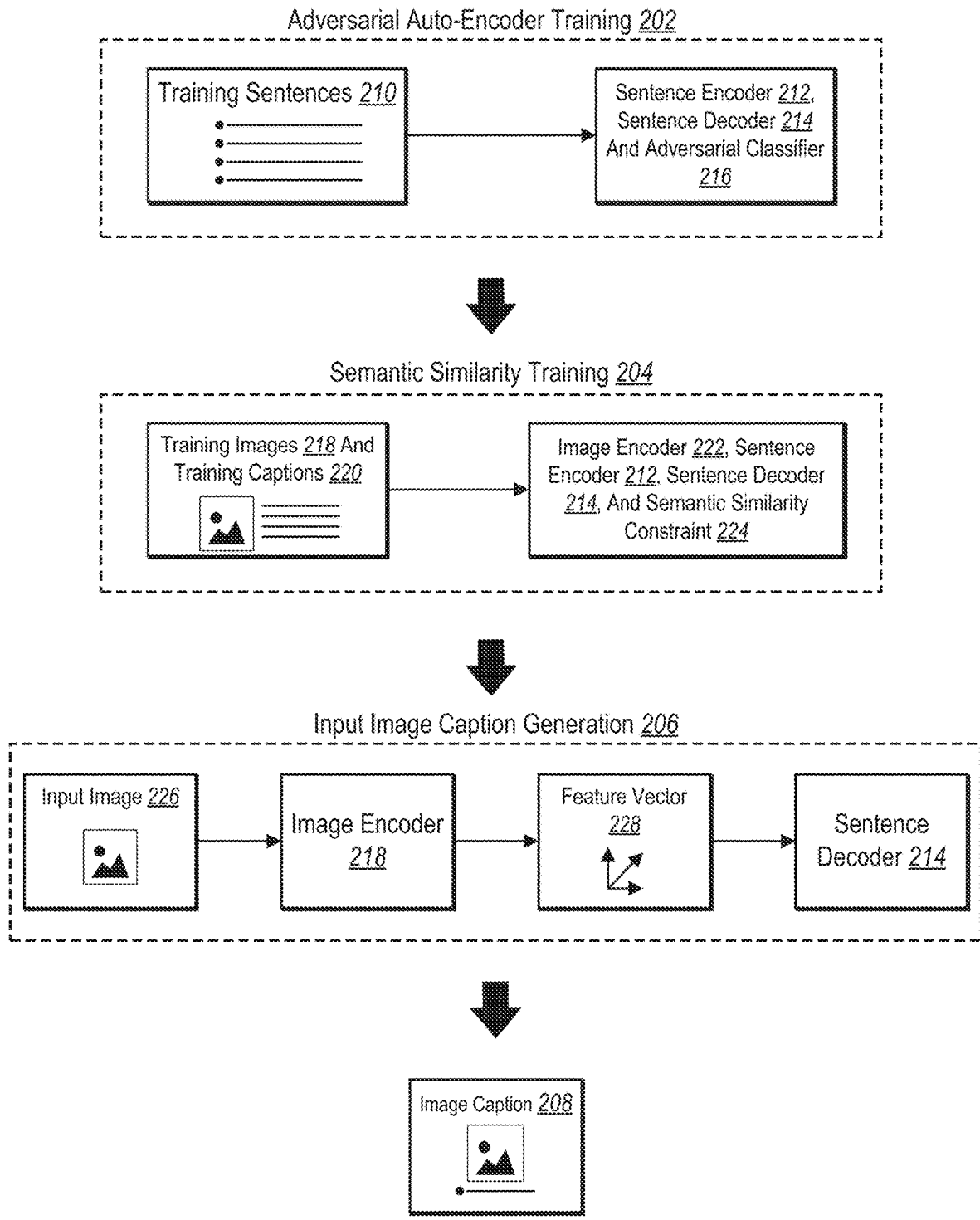
FIG. 2 illustrates a representation of training an image encoder neural network, training a sentence decoder neural network, and utilizing the image encoder neural network and sentence decoder neural network to generate an image caption in accordance with one or more embodiments.

As just mentioned, in one or more embodiments, the digital image captioning system trains a sentence encoder neural network, sentence decoder neural network, and image encoder neural network and then utilizes the trained image encoder neural network and sentence decoder neural network to generate a caption for an input digital image. FIG. 2 provides additional detail regarding training and utilizing an image encoder neural network, a sentence encoder neural network, and a sentence decoder neural network in accordance with one or more embodiments.

Specifically, FIG. 2 illustrates two steps of training: (1) adversarial auto-encoder training 202 and (2) semantic similarity training 204. In particular, the adversarial auto-encoder training 202 includes training a sentence encoder neural network 212 and a sentence decoder neural network 214 in conjunction with an adversarial classifier 216. Moreover, the semantic similarity training includes jointly training an image encoder neural network 222, the sentence encoder neural network 212, and the sentence decoder neural network 214 utilizing a semantic similarity constraint 224. FIG. 2 also illustrates a step of input image caption generation 206 resulting in creation of an image caption 208.

As shown in FIG. 2, the step of adversarial auto-encoder training 202 includes utilizing the training sentences 210 in conjunction with the sentence encoder neural network 212, the sentence decoder neural network 214, and the adversarial classifier 216. As used herein, the term "training sentence" refers to a sentence utilized to train a neural network. Indeed, as used herein, the adjective "training" refers to a manner of utilizing data to teach, instruct, or train a neural network. For example, the term "training image" refers to a digital image utilized to train a neural network. Similarly, the term "training caption" refers to a caption utilized to train a neural network.

As used herein, the term "adversarial classifier" refers to a digital classifier that determines a class corresponding to a sample. In particular, the term "adversarial classifier" refers to a binary classifier that determines whether a sample corresponds to a positive class or a negative class. For example, an adversarial classifier can predict whether a sample corresponds to a positive class (i.e., a distribution of feature vectors reflecting plausible sentences in a language) or a negative class (i.e., a class of feature vectors generated by a sentence encoder neural network).

As described in greater detail below, an adversarial classifier can be utilized to train a neural network working toward a conflicting goal. For example, an adversarial classifier can include a differential neural network training to differentiate between samples obtained from a distribution of plausible sentences and working adversarially to a sentence encoder neural network training to generate samples that are indistinguishable from a distribution of plausible sentences. In this manner, the differentiating neural network and the sentence decoder neural network are "adversarial' (i.e., working toward opposite goals). As the differential neural network becomes better at differentiating between positive and negative classes, the sentence decoder neural network becomes better at generating sentences that are more difficult to distinguish (i.e., reflect the distribution of plausible sentences). In this manner, the adversarial classifier constrains the model to generate feature vectors within a distribution of plausible linguistic expressions.

The digital image captioning system utilizes an adversarial classifier to determine an adversarial loss. As used herein, the term "adversarial loss" refers to a difference between a class predicted by an adversarial classifier and an actual class. For example, if an adversarial classifier predicts that a first sample corresponds to a positive class, the digital image captioning system determines an adversarial loss by comparing the predicted class (i.e., the positive class) with the sample's actual class.

For example, in relation to FIG. 2, the digital image captioning system utilizes the training sentences 210 together with the adversarial classifier 216 to train the sentence encoder neural network 212 and the sentence decoder neural network 214. Specifically, the digital image captioning system utilizes the sentence encoder neural network 212 to transform the training sentences 210 into feature vectors in a semantic space. The digital image captioning system then provides the generated feature vectors from the training sentences 210 to the adversarial classifier 216 together with sample feature vectors from a ground-truth distribution of plausible sentences. The adversarial classifier 216 predicts classes corresponding to the features vectors. Specifically, the adversarial classifier 216 predicts whether each of the feature vectors corresponds to a positive class (i.e., reflect the ground-truth distribution of plausible sentences) or a negative class (i.e., reflect feature vectors generated by the sentence encoder neural network 212). The digital image captioning system then determines an adversarial loss (i.e., difference between the predicted classes and the actual classes). The digital image captioning system then trains the sentence encoder neural network and the sentence decoder neural network based on the adversarial loss.

In addition to utilizing an adversarial loss to train the sentence encoder neural network 212 and the sentence decoder neural network 214, the digital image captioning system also generates a first reconstruction loss as part of the adversarial auto-encoder training 202. For example, the digital image captioning system utilizes the sentence encoder neural network 212 to generate feature vectors from the training sentences 210. The digital image captioning system then utilizes the sentence decoder neural network 214 to generate predicted sentences from the feature vectors. The digital image captioning system determines the first reconstruction loss by comparing the predicted sentences with the training sentences 210. Moreover, the digital image captioning system trains the sentence encoder neural network 212 and the sentence decoder neural network 214 based on the determined first reconstruction loss.

As shown in FIG. 2, upon performing the step of adversarial auto-encoder training 202, the digital image captioning system also performs the step of semantic similarity training 204. In particular, as shown in FIG. 2, the digital image captioning system accesses training images 218 and corresponding training captions 220. Moreover, the digital image captioning system utilizes the training images 218 and the corresponding training captions 220 to train the sentence encoder neural network 212, the sentence decoder neural network 214, and the image encoder neural network 222.

In particular, in one or more embodiments, the digital image captioning system utilizes training images with multiple corresponding training captions. For example, in one or more embodiments, the digital image captioning system accesses the training images 218, where each training image has multiple (e.g., two, three, four, five or more) corresponding training captions. By utilizing multiple training captions for each training image, the digital image captioning system can train the model to generate captions that reflect digital image contents with a greater variety in stylistic expression and more accurate semantic meaning.

As used herein, the term "semantic similarity constraint" refers to a limitation in training a neural network based on semantic similarity. In particular, the term "semantic similarity constraint" includes a limitation in training a neural network that comprises comparing feature vectors in a semantic space. For example, the term "semantic similarity constraint" includes a limitation in training a neural network that compares feature vectors of a training images in a semantic space to feature vectors of training captions in a semantic space.

For example, in relation to FIG. 2, the digital image captioning system utilizes the image encoder neural network 222 to generate feature vectors corresponding to the training images 218. The digital image captioning system also utilizes the sentence encoder neural network 212 to generate feature vectors corresponding to the training captions 220. The digital image captioning system then imposes a semantic similarity constraint on the resulting feature vectors. In particular, the digital image captioning system determines a semantic similarity loss between the feature vectors corresponding to the training images 218 and the feature vectors corresponding to the training captions 220. Moreover, the digital image captioning system trains the sentence encoder neural network and the image encoder neural network to minimize the semantic similarity loss.

In addition, the digital image captioning system can also utilize a second reconstruction loss in the step of semantic similarity training 204. For example, the digital image captioning system utilizes the sentence encoder neural network 212 to generate feature vectors from the training captions 220. The digital image captioning system utilizes the sentence decoder neural network 214 to predict captions from the generated feature vectors. The digital image captioning system then determines a second reconstruction loss by comparing the predicted captions with the training captions 220. Moreover, the digital image captioning system can train the sentence encoder neural network and the sentence decoder neural network utilizing the second reconstruction loss.

As shown in FIG. 2, upon performing the step 204, the digital image captioning system can also perform the step 206 of input image caption generation. In particular, as shown, the digital image captioning system performs the step 206 by utilizing the image encoder neural network 222 and the sentence decoder neural network 214. More specifically, the digital image captioning system applies the image encoder neural network 222 to an input digital image 226 to generate a feature vector 228 in a semantic space. The digital image captioning system then applies the sentence decoder neural network 214 to the feature vector 228 to generate the caption 208.

Although FIG. 2 illustrates the step 202 and the step 204 as two individual steps performed a single time, in one or more embodiments, the digital image captioning system performs the steps 202 and 204 repeatedly (and in different orders). For example, in one or more embodiments, the digital image captioning system repeatedly performs the step 202 until the sentence encoder neural network and the sentenced decoder neural network converge. Thereafter, the digital image captioning system iteratively performs both the step 202 and the step 204. Specifically, digital image captioning system accesses a first data set of training images and training captions and performs the step 204. The digital image captioning system then accesses a second data set of training sentences and performs the step 202. The digital image captioning system then accesses a third data set of training images and training captions and performs the step 204. The digital image captioning system accesses a fourth data set of training sentences and performs the step 202, repeating until the image encoder neural network 222, the sentence encoder neural network 212, and the sentence decoder neural network 214 converge. In this manner, the digital image captioning system can train the image encoder neural network 222, the sentence encoder neural network 212, and the sentence decoder neural network 214 utilizing the adversarial classifier 216 and the semantic similarity constraint 224.

Figure 3:
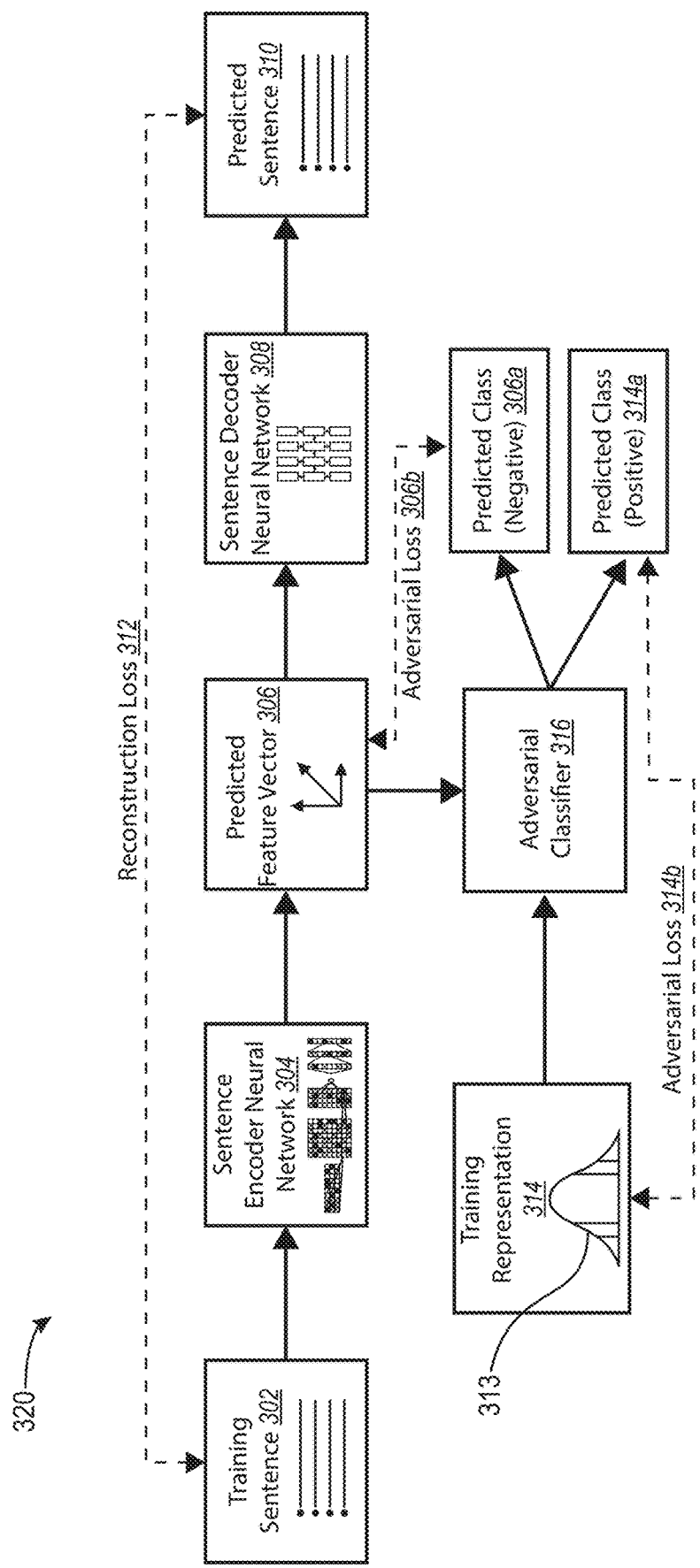
FIG. 3 illustrates training a sentence encoder neural network and sentence decoder neural network utilizing an adversarial loss in accordance with one or more embodiments.

Turning now to FIG. 3, additional detail will be provided regarding utilizing an adversarial classifier to train a sentence encoder neural network and a sentence decoder neural network. In particular, FIG. 3 illustrates an example embodiment of the step 202 of adversarial auto-encoder training. More particularly, as shown, FIG. 3 illustrates a step 320 for training a sentence decoder neural network, utilizing the training sentences and an adversarial classifier, to generate captions from feature vectors in a semantic space.

Indeed, as shown in FIG. 3, the digital image captioning system utilizes a training sentence 302 together with an adversarial classifier 316 to train a sentence encoder neural network 304 and a sentence decoder neural network 308. Specifically, the digital image captioning system generates adversarial losses 306b, 314b and a reconstruction loss 312 and utilizes the adversarial losses 306b, 314b and the reconstruction loss 312 to train the sentence encoder neural network 304 and the sentence decoder neural network 308.

The digital image captioning system can utilize a variety of different sources to access the training sentence 302. For example, in one or more embodiments, the digital image captioning system utilizes the BookCorpus dataset described in Zhu, Y., Kiros, R., Zemel, R., Salakhutdinov, R., Urtasun, R., Torralba, A., & Fidler, S., Aligning books and movies: Towards story-like visual explanations by watching movies and reading books, In Proceedings of the IEEE International Conference on Computer Vision, 19-27 (2015), the entire contents of which are hereby incorporated by reference. BookCorpus contains 80 million sentences from books and movie subtitles. In addition to BookCorpus, the digital image captioning system can utilize any repository of sentences for any variety of languages.

Upon accessing the training sentence 302, the digital image captioning system utilizes the sentence encoder neural network 304 to predict a feature vector 306 from the training sentence 302. The digital image captioning system can utilize a variety of neural networks for the sentence encoder neural network 304. For example, the digital image captioning system can utilize word-level recurrent neural networks, word-level convolutional neural networks, and character-level convolutional neural networks. In this context, "word-level" and "character-level" refer to the level at which data is encoded when providing data to the neural network. To illustrate, character-level means that the digital image captioning system encodes each character in a sentence.

For example, in one or more embodiments, the digital image captioning system encodes all characters utilizing one-hot coding (i.e., one-of-k coding that utilizes a single bit in a group of bits to reflect a character). To illustrate, the digital image captioning system can encode the letter "A" as 00000000000000000000000001 and the character as 00000000000000000000000010. Upon encoding all characters in a sentence, the digital image captioning system can feed the encoded sequence into a sentence encoder neural network (for example, convolutional neural networks).

Layers of the sentence encoder neural network 304 analyze the encoded characters and generate a semantic representation. In particular, different layers of the sentence encoder neural network 304 analyze encoded characters of a sentence at different levels of abstraction. Upon analyzing the encoded characters, the sentence encoder neural network 304 generates a semantic representation of the training sentence 302.

The digital image captioning system can utilize a variety of different neural network architectures for the sentence encoder neural network 304. For example, in one or more embodiments, the digital image captioning system utilizes a network of six convolutional layers, where each of the convolution layers is followed by a max pooling layer and a rectified linear activation function. The digital image captioning system can utilize these layers to analyze a training sentence and generate a feature vector. To illustrate, in one or more embodiments, the digital image captioning system utilizes the sentence encoder neural network 304 to generate a 500-dimension feature vector in a semantic space. In this manner, the digital image captioning system generates the predicted feature vector 306, which encapsulates the semantic meaning of the training sentence 302 in a semantic space.

Although the foregoing description illustrates feature vectors with particular dimensionalities, the digital image captioning system can utilize a variety of different feature vectors with different dimensionalities. For example, rather than utilizing feature vectors with 500 dimensions, the digital image captioning system can utilize feature vectors with different number of dimensions (e.g., a 2048-dimensional feature vector or a 100-dimensional feature vector).

As shown in FIG. 3, upon generating the predicted feature vector 306, the digital image captioning system utilizes the sentence decoder neural network 308 to generate a predicted sentence 310. The digital image captioning system can utilize a variety of neural networks as the sentence decoder neural network 308, including, for example, word-level recurrent neural networks and character-level recurrent neural networks. For example, in one or more embodiments, the digital image captioning system utilizes character-level long short-term memory (LSTM)-based recurrent neural network.

In one or more embodiments, the digital image captioning system encodes the sentence character by character (e.g., utilizing one-hot encoding), and feeds the characters into the recurrent neural networks. During the training, at each time step of the recurrent neural networks, the one-hot code of the previous character is fed into the LSTM unit. Conditioned on the past generated characters (i.e., the hidden and output layers of the recurrent neural network from the previous steps), the LSTM unit predicts the character at the current time step. In this manner, the digital image captioning system trains the sentence decoder neural network 308 to predict a sentence. Moreover, to improve performance, in one or more embodiments, the digital image captioning system stacks two layers of LSTM.

In one or more embodiments, the digital image captioning system utilizes a character-level convolutional neural network as an encoder neural network together with a character-level recurrent neural network as a decoder neural networks. In one or more embodiments, this combination works the best (i.e., most efficiently and accurately) among various combinations in training for digital image captioning.

As shown in FIG. 3, upon generating the predicted sentence 310, the digital image captioning system determines the reconstruction loss 312. In particular, the digital image captioning system determines the reconstruction loss 312 by comparing the predicted sentence 310 and the training sentence 302. The digital image captioning system can utilize a variety of loss functions to determine the reconstruction loss 312. For example, the digital image captioning system can apply a negative log-likelihood function (or a cosine distance function or Euclidean distance function, etc.).

The digital image captioning system then can utilize the reconstruction loss 312 to train the sentence encoder neural network 304 and the sentence decoder neural network 308. For example, the digital image captioning system trains the sentence encoder neural network 304 and the sentence decoder neural network 308 to minimize the reconstruction loss 312 for the training sentence 302. By minimizing the reconstruction loss 312, the digital image captioning system trains the sentence encoder neural network 304 and the sentence decoder neural network 308 to encode and generate predicted sentences similar to the training sentences.

As shown in FIG. 3, in addition to the reconstruction loss 312, the digital image captioning system also utilizes adversarial losses to train the sentence encoder neural network 304 and sentence decoder neural network 308. In particular, the digital image captioning system utilizes the adversarial classifier 316 to distinguish samples into classes and generate the adversarial losses 306b, 314b. The digital image captioning system then trains the sentence encoder neural network 304 based on the adversarial losses 306b, 314b. By utilizing the adversarial loss in conjunction with the reconstruction loss, the digital image captioning system can learn to extract the semantic meaning of the training sentence 302 and reconstruct the predicted sentence 310 with a similar (but not identical) semantic meaning.

As illustrated, the adversarial classifier 316 is utilized as a binary classifier to distinguish between two classes. In particular, the adversarial classifier 316 is utilized to distinguish a positive class of training samples from a prior distribution and a negative class of generated samples. Specifically, the adversarial classifier 316 seeks to predict whether a sample is generated from the sentence encoder neural network 304 (i.e., a negative sample) or whether a sample is drawn from a known distribution 313 (i.e., a positive sample). Thus, in one or more embodiments, the adversarial classifier 316 comprises a differential neural network. For example, the adversarial classifier 316 can include three layers of linear projection followed by a leaky rectified linear activation function.

To illustrate, FIG. 3 illustrates the digital image captioning system providing the predicted feature vector 306 to the adversarial classifier 316. The adversarial classifier 316 seeks to determine whether the predicted feature vector 306 is a positive sample (i.e., a training representation from a prior distribution 313) or a negative sample (i.e., generated by the sentence encoder neural network 304). Accordingly, the adversarial classifier 316 generates a predicted class 306a corresponding to the predicted feature vector 306. For example, the adversarial classifier 316 can predict that the predicted feature vector 306 belongs to the negative class (i.e., was generated by the sentence encoder neural network 304).

The digital image captioning system then generates the adversarial loss 306b by comparing the predicted class 306a with the actual class. For example, if the predicted class 306a is incorrect, the adversarial loss 306b would be larger than if the adversarial predicted class 306a were correct. The digital image captioning system can utilize a variety of loss measures for the adversarial loss 306b. For example, the adversarial loss 306a can be binary (i.e., 0 if the predicted class is correct and 1 if the predicted class is incorrect). The adversarial loss 306a can also comprise a gradient measure (e.g., based on the confidence or likelihood of the predicted class).

Similar, to the adversarial loss 306b (generated based on the predicted feature vector 306), the digital image captioning system can also generate the adversarial loss 314b based on the training representation 314. The training representation 314 is a sample from the distribution 313. The distribution 313 is a pre-defined distribution (e.g., a prior distribution) within a semantic space. Specifically, the distribution 313 is a Gaussian distribution within a semantic space where any sample can be decoded as a plausible sentence.

The digital image captioning system samples the training representation 314 (i.e., a training feature vector) from the distribution 313 and provides the training representation to the adversarial classifier 316. The adversarial classifier 316 then generates the predicted class 314a corresponding to the training representation 314. Specifically, the adversarial classifier 316 predicts whether the training representation 314 belongs to a positive class (i.e., is a sample from the distribution 313) or a negative class (i.e., is a sample generated from the sentence encoder neural network 304).

The digital image captioning system then determines the adversarial loss 314b from the predicted class 314a. In particular, the digital image captioning system generates the adversarial loss 314b by comparing the predicted class 314a with the actual class. For example, if the predicted class 314a is incorrect, the adversarial loss 314b would be larger than if the predicted class 314a were correct.

The digital image captioning system can also utilize the adversarial loss 306b and/or the adversarial loss 314b to train the adversarial classifier 316 and/or the sentence encoder neural network 304. For example, the digital image captioning system trains the adversarial classifier 316 to minimize the adversarial loss 306b and/or the adversarial loss 314b. In this manner, the digital image captioning system trains the adversarial classifier 316 to better distinguish between positive samples (i.e., samples from the distribution 313) and negative samples (i.e., predicted feature vectors generated from the sentence encoder neural network).

Moreover, the digital image captioning system can train the sentence encoder neural network 304 utilizing the adversarial loss 306b and/or the adversarial loss 314b. For example, the digital image captioning system trains the sentence encoder neural network 304 to maximize the adversarial loss 306b and/or the adversarial loss 314b. In this manner, the digital image captioning system trains the sentence encoder neural network 304 to generate predicted feature vectors that are difficult to distinguish from samples from the prior distribution 313.

As just described, the adversarial classifier 316 is adversarial to the sentence encoder neural network 304. In particular, the digital image captioning system trains the adversarial classifier 316 to distinguish between feature vectors generated by the sentence encoder neural network 304 and training representations from the distribution 313. On the other hand, the digital image captioning system trains the sentence encoder neural network 304 to predict feature vectors that are not distinguishable from the distribution 313. Accordingly, as the digital image captioning system trains the sentence encoder neural network 304 and the adversarial classifier 316 they both improve at their disparate functions. The result, is that the sentence encoder neural network 304 learns to generate predicted feature vectors that correspond to the distribution 313. In this manner, the adversarial classifier 316 acts as a constraint on the sentence encoder neural network 304.

Although FIG. 3 illustrates utilizing a training sentence to generate both the reconstruction loss 312 and the adversarial losses 306b, 314b (and train the sentence encoder neural network 304 and the sentence decoder neural network 308), in one or more embodiments, the digital image captioning system utilizes different training phases that apply different training sentences to generate reconstruction losses and adversarial losses. For example, the digital image captioning system can utilize a first data set for a first phase that trains the sentence encoder neural network 304 and the sentence decoder neural network 308 utilizing reconstruction losses. The digital image captioning system can utilize a second data set for a second phase that trains the sentence encoder neural network 304 and the adversarial classifier 316 utilizing adversarial losses. Specifically, in the second phase, the digital image captioning system can train the adversarial classifier 316 to discriminate between positive samples and negative samples (i.e., minimize the adversarial loss) and then train the sentence encoder neural network 304 to generate feature vectors that mirror training samples from the distribution 313 (i.e., maximize adversarial loss). The digital image captioning system can iteratively repeat these acts to train the sentence encoder neural network 304 and the sentence decoder neural network 308.

Accordingly, as shown in FIG. 3, the digital image captioning system utilizes unsupervised text data (e.g., the training sentence 302) to train the adversarial auto-encoder (i.e., the sentence encoder neural network 304 and the sentence decoder neural network 308) through generative adversarial networks. Thus, the digital image captioning system trains an adversarial auto-encoder to generate captions from training sentences.

In one or more embodiments, the digital image captioning system can also perform additional acts to stabilize training. In particular, in one or more embodiments, the digital image captioning system utilizes weight normalization and mini-batch discrimination to stabilize training. Weight normalization helps to ensure that the adversarial classifier 316 will not fall into a trivial local optimal solution (e.g., always predict probability of 0.5 for all samples, whether positive or negative). The mini-batch discrimination makes sure that the sentence encoder neural network 304 will not map all sentences into one point in semantic space (which is also a trivial solution). In particular, in one or more embodiments, the digital image captioning system utilizes weight normalization and mini-batch discrimination, as described in Salimans, T., Goodfellow, I., Zaremba, W., Cheung, V., Radford, A., & Chen, X., Improved Techniques for Training GANs, arXiv preprint arXiv:1606.03498 (2016), the entire contents of which are incorporated by reference.

In addition to the foregoing, the digital image captioning system can also be described in terms of equations for performing functions via a computing device. For example, the digital image captioning system can utilize an adversarial classifier D(z) to determine an adversarial loss and train an adversarial auto-encoder. In particular, given a prior distribution p(z) (e.g., the distribution 313), consider an encoder q(z|x) (e.g., the sentence encoder neural network 304) that is a deterministic function that generates a representation (e.g., the predicted feature vector 306) from input (e.g., from training sentences). Moreover, consider a decoder p(x|z) (e.g., the sentence decoder neural network 308) that reconstructs the input from the representation (e.g., generates the predicted sentence 310).

In one or more embodiments, the digital image captioning system utilizes an adversarial classifier D(z) (e.g., the adversarial classifier 316). The adversarial classifier D(z), is a binary classifier used to distinguish negative samples q(z) from positive samples p(z). The adversarial classifier is composed of a two-layer feed-forward neural network, in which each layer is followed by a batch normalization layer and a ReLU activation function.

The adversarial classifier D(z) aims to enforce the aggregated posterior distribution of $q(z)=\int_x q_\phi(z|x)p_d(x)dx$ to be similar with the prior distribution of p(z). The general objective function is:

$$\mathcal{L}_{(\theta,\phi,\xi)} = E_{p(z)}[\log D_\xi(z)] + E_{p_d(x)}[\log((1-D_\xi(q_\phi(z|x)))] + E_{q_\phi(z|x)}[\log p_\theta(x|z)]$$

The combination of the first two terms is the binary classification error in the adversarial classifier (e.g., the adversarial losses 306b, 314b) and the third term is the reconstruction error (e.g., the reconstruction loss 312). As used in this equation, λ is a mixing constant (i.e., a trade-off value). For example, in one or more embodiments, the digital image captioning system sets λ to be 1 (or 0 or another value between 0 and 1). The training for one iteration can be decomposed into two phase. In the first phase, the digital image captioning system updates the parameters in the discriminator D to maximize the objective function. Then in the second phase, the digital image captioning system updates the parameters in encoder q(z|x) and decoder p(x|z) to minimize the objective function.

Figure 4:
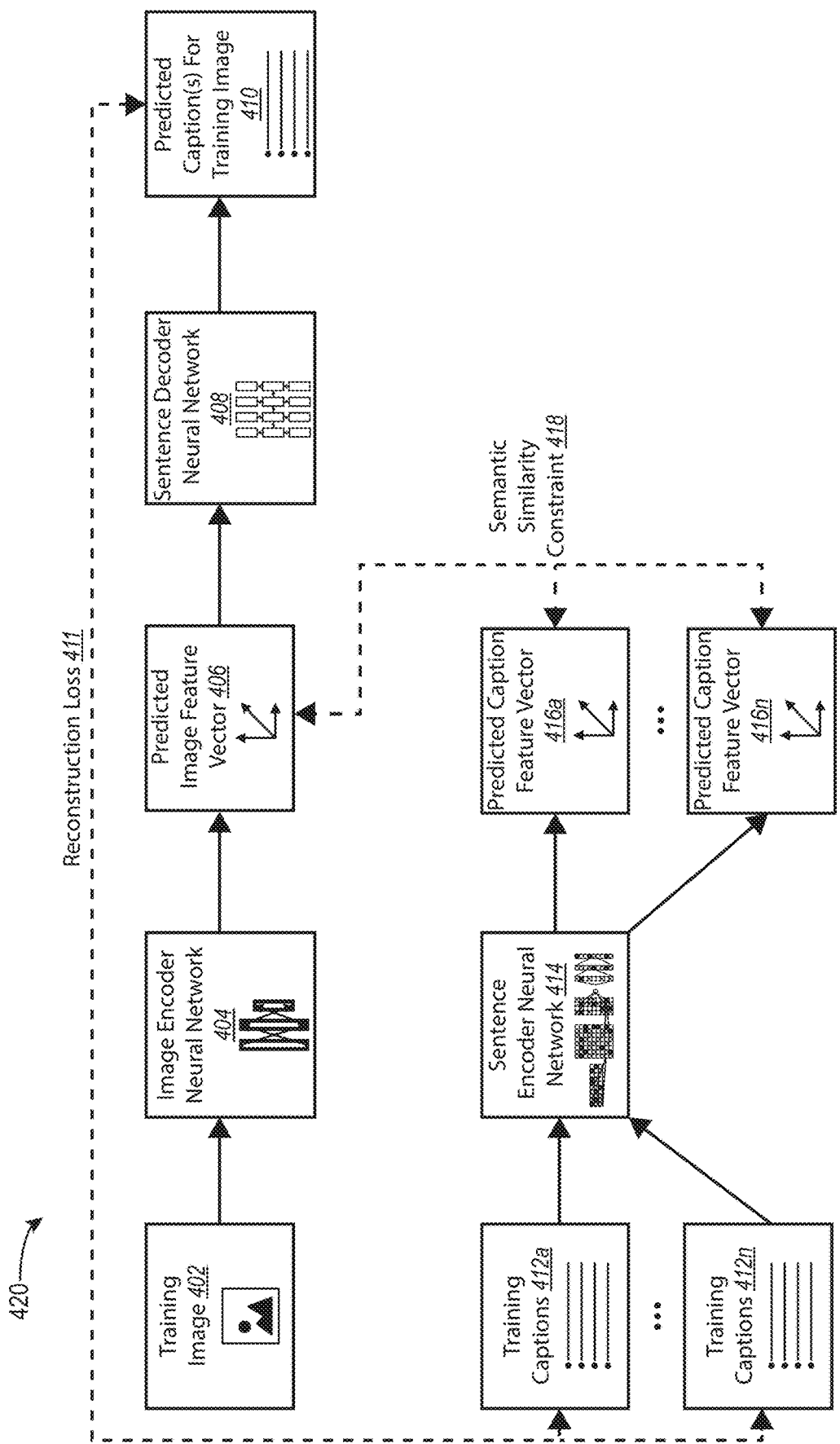
FIG. 4 illustrates a representation of training a sentence encoder neural network, training a sentence decoder neural network, and training an image encoder neural network utilizing a semantic similarity constraint in accordance with one or more embodiments.

Turning now to FIG. 4, additional detail will be provided regarding training an image encoder neural network. In particular, FIG. 4 illustrates an exemplary embodiment of jointly training an image encoder neural network, a sentence encoder neural network, and a sentence decoder neural network (e.g., the step 204). Indeed, as shown, FIG. 4 illustrates a step 420 of training an image encoder neural network utilizing training images, training captions, and a semantic similarity constraint, to generate feature vectors in the semantic space.

In relation to FIG. 4 the digital image captioning system utilizes a training image 402 and a corresponding plurality of training captions 412a-412n. Specifically, the digital image captioning system generates a predicted image feature vector 406 from the training image 402 and the predicted caption feature vectors 416a-416n from the training captions 412a-412n. The digital image captioning system then imposes a semantic similarity constraint 418 to train an image encoder neural network 404 and a sentence encoder neural network 414. Moreover, the digital image captioning system trains the image encoder neural network 404 and a sentence decoder neural network 408 based on a reconstruction loss 411.

As just mentioned, in one or more embodiments, the digital image captioning system accesses training images with corresponding training captions. In particular, the digital image captioning system can access training images, where each training image corresponds to a plurality of training captions. Thus, in relation to the embodiment of FIG. 4, the digital image captioning system utilizes the training image 402 and the training captions 412a-412n, where each of the training captions 412a-412n describe the contents of the training image 402 in a different manner. For example, the training image 402 can include a digital image of a beach and the training captions 412a-412n can include sentences describing the digital image, such as: "Waves crashing on a beach"; "People playing on a beach"; "Clear day on the coast"; or "Relaxing day at the beach."

The digital image captioning system can utilize a variety of data sets to access training images and corresponding training captions. For example, in one or more embodiments, the digital image captioning system utilizes MSCOCO, which contains 80,000 training images and each image is paired with 5 training captions. In other embodiments, the digital image captioning system utilizes the ADOBE® STOCK® dataset, which includes a large repository of digital images and corresponding captions.

As shown in FIG. 4, the digital image captioning system generates the reconstruction loss 411 utilizing the image encoder neural network 404 and the sentence decoder neural network 408. In particular, the digital image captioning system utilizes the image encoder neural network 404 to analyze the training image 402 and generate the predicted image feature vector 406. The digital image captioning system then utilizes the sentence decoder neural network 408 to analyze the predicted image feature vector 406 and generates predicted caption(s) 410 for the training image 402. By comparing the predicted caption(s) 410 and one or more of the plurality of training captions 412a-412n, the digital image captioning system can generate the reconstruction loss 411.

As shown, the image encoder neural network 404 analyzes features of the training image 402 and generates the predicted image feature vector 406. The digital image captioning system can utilize an image encoder neural network with a variety of different architectures. For example, in one or more embodiments, the digital image captioning system utilizes Residual Nets as described by He, K., Zhang, X., Ren, S., & Sun, J., Identity Mappings In Deep Residual Networks, arXiv preprint arXiv:1603.05027 (2016), the entire contents of which are incorporated by reference herein. In particular, the digital image captioning system can utilize Residual Nets to extract image features from an input digital image. Moreover, in one or more embodiments, the digital image captioning system utilizes Residual Nets, and adds two layers of linear transformations followed by rectified linear activation functions to embed the extracted features of the input digital images in a semantic space.

For example, the digital image captioning system can utilize Residual Nets to generate a 2048-dimensional feature vector for each image. The digital image captioning system can train one or more additional layers to project these 2048 dimensions into a low-dimensional semantic space. In particular, the digital image captioning system can utilize an additional layer to project the 2048-dimension feature vector to a 500-dimension feature vector in a semantic space. In this manner, the digital image captioning system can utilize the sentence encoder neural network 304 to generate the predicted feature vector 306. As mentioned above, although the foregoing description illustrates feature vectors with particular dimensionalities, the digital image captioning system can utilize a variety of different feature vectors with different dimensionalities Moreover, as described previously, the digital image captioning system can also utilize the sentence decoder neural network 408 (e.g., an exemplary embodiment of the sentence decoder neural network 308) to predict sentences (i.e., captions) from the predicted image feature vector 406. In particular, the digital image captioning system can utilize the sentence decoder neural network 408 to generate the predicted caption(s) 410 for the training image 402.

Upon generating the predicted caption(s) 410, the digital image captioning system also determines the reconstruction loss 411. Specifically, the digital image captioning system determines the reconstruction loss 411 by comparing the predicted caption(s) 410 with one or more of the training captions 412a-412n. The digital image captioning system can utilize a variety of loss functions to determine the reconstruction loss 411. For instance, the digital image captioning system can utilize a negative log-likelihood function (or a cosine distance function or Euclidean distance function, etc.).

The digital image captioning system then utilizes the reconstruction loss 411 to train the image encoder neural network 404 and the sentence decoder neural network 408. For example, the digital image captioning system trains the image encoder neural network 404 and the sentence decoder neural network 408 to minimize the reconstruction loss 411. By minimizing the reconstruction loss 411, the digital image captioning system trains the image encoder neural network 404 and the sentence decoder neural network to generate captions training images that reflect the contents of the training image.

In addition to training the image encoder neural network 404 based on the reconstruction loss 411, the digital image captioning system can also train the image encoder neural network 404 based on the semantic similarity constraint 418. Indeed, as shown in FIG. 4, the digital image captioning system utilizes the sentence encoder neural network 414 (e.g., an exemplary embodiment of the sentence encoder neural network 304) to generated feature vectors. Specifically, the digital image captioning system utilizes the sentence encoder neural network 414 to generate predicted caption feature vectors 416a-416n corresponding to the training captions 412a-412n. The digital image captioning system then applies the semantic similarity constraint 418 to the predicted image feature vector 406 and the predicted caption feature vectors 416a-416n.

In one or more embodiments, the digital image captioning system applies the semantic similarity constraint 418 by determining a semantic similarity loss between the predicted image feature vector 406 and the predicted caption feature vectors 416a-416n. For example, the digital image captioning system determines a semantic similarity loss by comparing the predicted image feature vector 406 and the predicted caption feature vectors 416a-416n. The digital image captioning system then trains the image encoder neural network 404 and the sentence encoder neural network 414 based on the semantic similarity loss. Specifically, the digital image captioning system trains the image encoder neural network 404 and the sentence encoder neural network 414 by minimizing the semantic similarity loss.

By minimizing the semantic similarity loss, the digital image captioning system trains the image encoder neural network 404 to generate feature vectors from training images that are semantically similar to the training captions. Moreover, the digital image captioning system trains the sentence encoder neural network 414 to generate feature vectors that are semantically similar to the contents of the training image. In this manner, the digital image captioning system can jointly train image and language modeling by tying the features of training images to training captions in a semantic space. Thus, if two images are similar in terms of content, their captions will be closely related. Moreover, for the same image, different captions will be similar in terms of semantics. Accordingly, the digital image captioning system applies the semantic similarity constraint 418 to encourage similarity between the image features and text features from an image-caption pair and to encourage similarity between text features of different captions of the same image.

Although FIG. 4 illustrates utilizing the training image 402 and the corresponding training captions 412a-412n to generate both the reconstruction loss 411 and a semantic similarity loss (as part of the semantic similarity constraint 418), in one or more embodiments, the digital image captioning system utilizes different training phases that apply different training images and training captions to generate reconstruction losses and semantic similarity losses. For example, the digital image captioning system can utilize a first mini-data set for a first phase that trains the image encoder neural network 404 and the sentence decoder neural network 408 based on a reconstruction loss. Moreover, the digital image captioning system can utilize a second mini-date set for a second phase that trains the image encoder neural network and the sentence encoder neural network 414 based on a semantic similarity loss. The digital image captioning system can iteratively repeat these phases to jointly train the image encoder neural network the sentence decoder neural network 408, and the sentence encoder neural network 414.

FIGS. 3 and 4 separately illustrate training a model utilizing an adversarial classifier and training a model utilizing a semantic similarity constraint (e.g., the steps 202 and 204). As discussed above, in one or more embodiments, the digital image captioning system can iteratively train utilizing an adversarial classifier and semantic similarity constraint (e.g., iteratively perform the steps 202 and 204). For example, FIG. 5 illustrates an exemplary training strategy in accordance with one or more embodiments.

Figure 5:
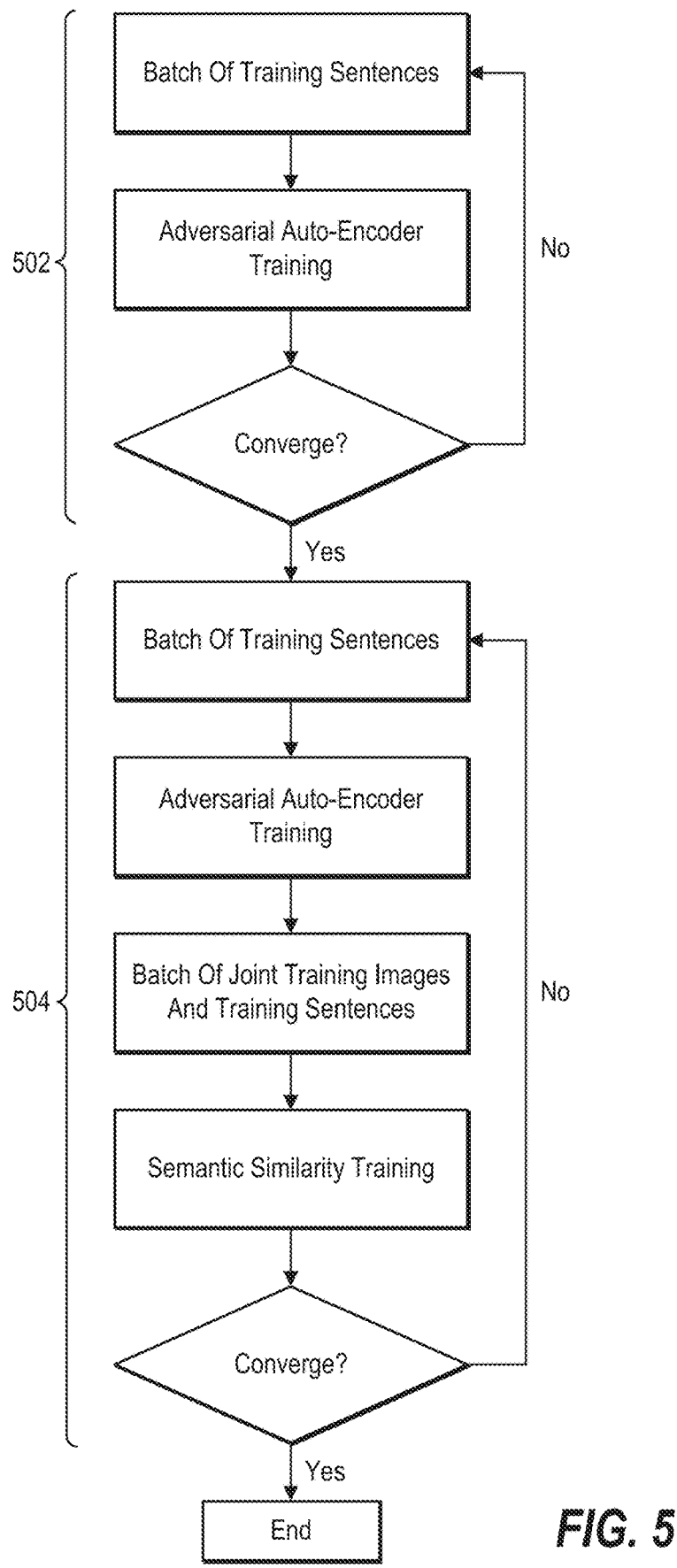
FIG. 5 illustrates a representation of iteratively training a sentence encoder neural network, sentence decoder neural network, and image encoder neural network in accordance with one or more embodiments.

Specifically, FIG. 5 illustrates performing a first training stage 502. At the first training stage 502 the digital image captioning system repeatedly utilizes batches of training sentences to perform adversarial auto-encoder training (as described in relation to FIG. 3). In particular, the digital image captioning system utilizes batches of training sentences from the BookCorpus training sent to train a sentence encoder neural network and a sentence decoder neural network utilizing an adversarial classifier. As shown in FIG. 5, after determining that the adversarial auto-encoder converges (i.e., a certain number of iterations or the solution converges to within a particular tolerance), the digital image captioning system performs the second training stage 504.

As shown, the second training stage 504 alternates between training the adversarial auto-encoder (e.g., as described in relation to FIG. 3) and semantic similarity training (e.g., as described in relation to FIG. 4). Specifically, the digital image captioning system accesses a batch of training sentences and utilizes the batch of training sentences to train the adversarial auto-encoder. The digital image captioning system then accesses a batch of joint training images and training sentences and jointly trains the image encoder neural network, the sentence encoder neural network, and the sentence decoder neural network. The digital image captioning system repeats this process (iteratively performing adversarial auto-encoder training and semantic similarity training) until the model converges (i.e., a certain number of iterations or the solution converges to within a particular tolerance).

Figure 6B:
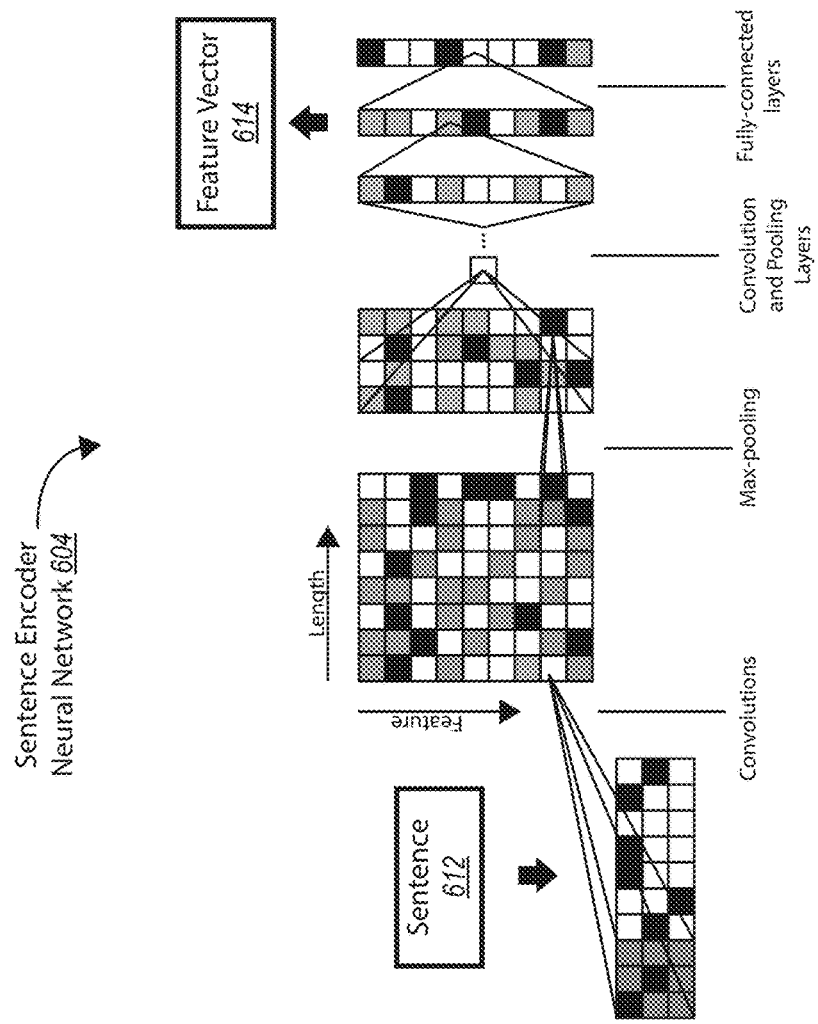
FIGS. 6A-6C illustrate exemplary architectures of a sentence encoder neural network, a sentence decoder neural network, and an image encoder neural network in accordance with one or more embodiments.
Figure 6A:
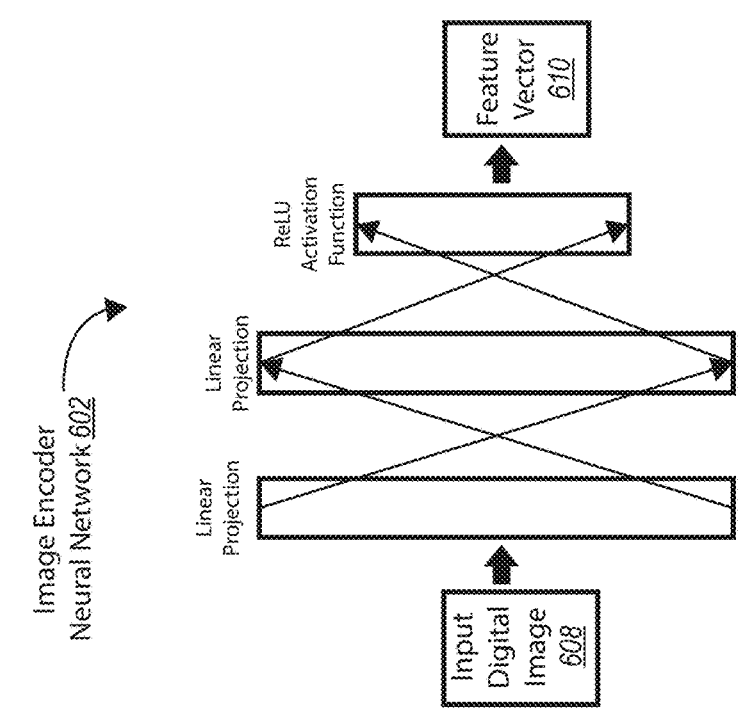
Figure 6C:
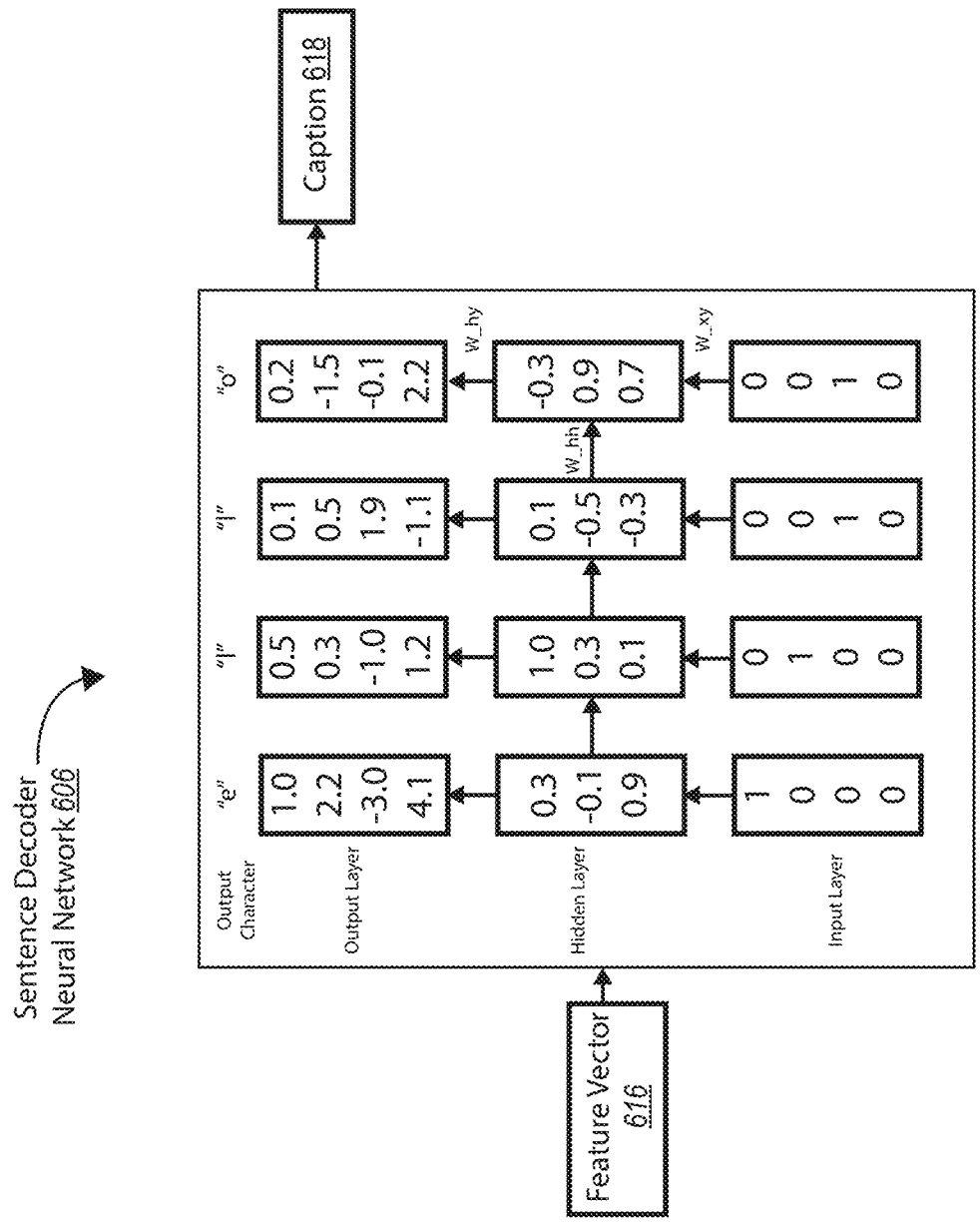

As mentioned above, the digital image captioning system can utilize neural networks of a variety of different architectures. FIGS. 6A-6C illustrate exemplary architectures of different neural networks utilized by the digital image captioning system in accordance with one or more embodiments. In particular, FIG. 6A illustrates an exemplary architecture of an image encoder neural network 602, FIG. 6B illustrates an exemplary architecture of a sentence encoder neural network 604, and FIG. 6C illustrates an exemplary architecture of a sentence decoder neural network 606.

For example, FIG. 6A illustrates the image encoder neural network 604. As shown, the image encoder neural network 602 receives an input digital image 608 and generates a feature vector 610. As mentioned, in one or more embodiments, the digital image captioning system transforms the input digital image 608 into a plurality of image features utilizing a Residual Net. Thus, the input digital image 608 can include a raw digital image or a plurality of image features generated by the Residual Net.

As shown, the image encoder neural network generates the feature vector 610 from the input digital image 608 utilizing two linear projection layers. In particular, the digital image captioning system utilizes two linear projection layers followed by a rectified linear activation function. Utilizing the two linear projection layers and the rectified linear activation function, the image encoder neural network generates the feature vector 610.

In addition, FIG. 6B illustrates the sentence encoder neural network 604. As shown, the sentence encoder neural network 604 generates a feature vector 614 from a sentence 612. The sentence encoder neural network 604 of FIG. 6B is a convolutional neural network (i.e., a character-level convolutional neural network). Specifically, the sentence encoder neural network 604 utilizes a plurality of convolution layers and max-pooling layers followed by fully-connected layers to generate the feature vector 614. More specifically, the sentence encoder neural network 604 includes six convolutional layers, where each of the convolutional layers is followed by a max-pooling layer and a rectified linear activation function. Moreover, all the convolution layers and the pooling layers are going across the time, which means the operations are temporal.

FIG. 6C illustrates the sentence decoder neural network 606. As shown, the sentence decoder neural network 606 transforms a feature vector 616 into a caption 618. The sentence decoder neural network 606 illustrated in FIG. 6C is a character-level recurrent neural network. Specifically, the neural network illustrated is a character-level long short-term memory (LSTM)-based recurrent neural network. As shown, the sentence decoder neural network 606 consists of an input layer, a hidden layer, and an output layer. At each time step, the digital image captioning system analyzes the previous time step's hidden layer and outputs at as part of the input to the next time step's hidden layer.

Figure 7:
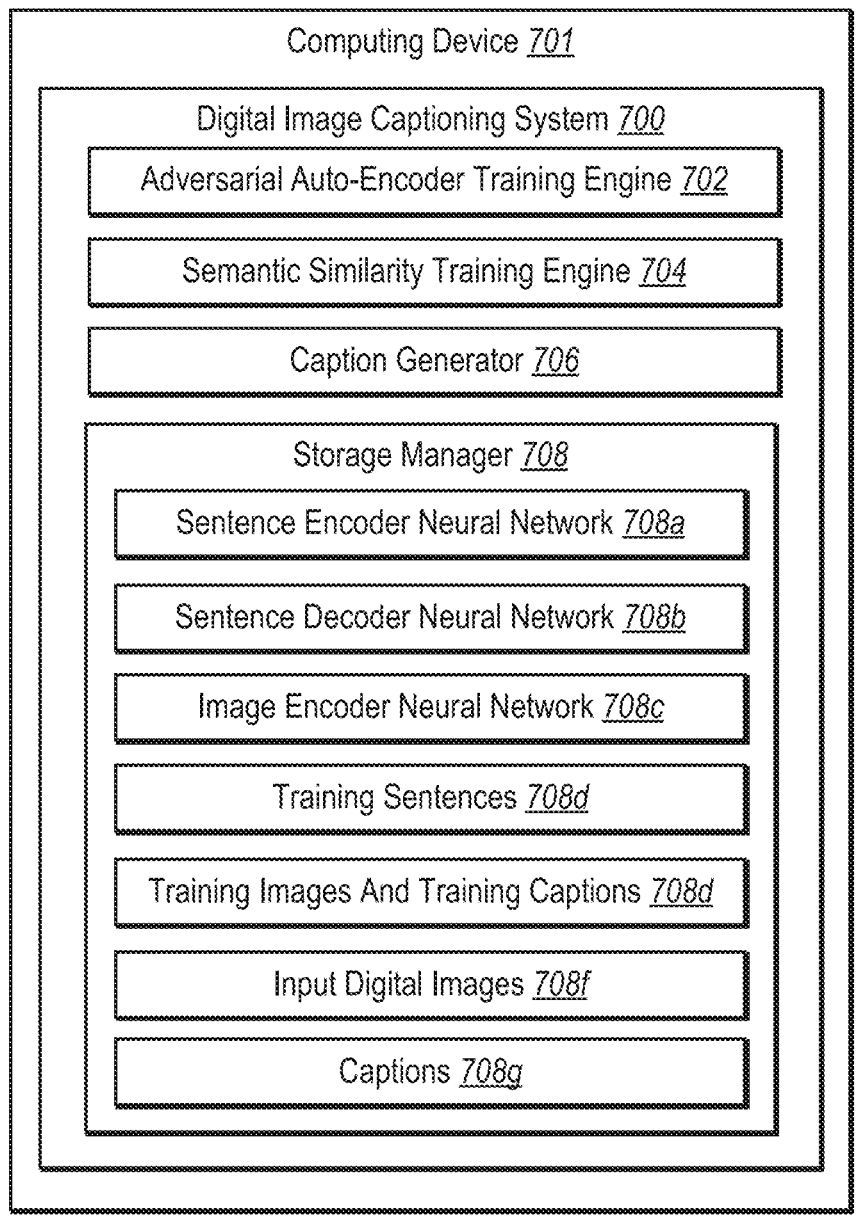
FIG. 7 illustrates a schematic diagram illustrating a digital image caption system in accordance with one or more embodiments.

Turning now to FIG. 7, additional detail is provided regarding components and capabilities of one embodiment of the digital image captioning system. In particular, FIG. 7 illustrates an embodiment of an exemplary digital image captioning system 700 (e.g., the digital image captioning system referenced above) implemented by a computing device 701. Example computing devices are described below in relation to FIG. 11. As shown, the digital image captioning system 700 may include, but is not limited to an adversarial auto-encoder training engine 702, a semantic similarity training engine 704, a caption generator 706, and a storage manager 708 (comprising a sentence encoder neural network 708a, a sentence decoder neural network 708b, an image encoder neural network 708c, training sentences 708d, training images and training captions 708e, input digital images 708f, and captions 708g).

As just mentioned, and as illustrated in FIG. 7, the digital image captioning system 700 may include the adversarial auto-encoder training engine 702. The adversarial auto-encoder training engine 702 can train, teach, or instruct a sentence encoder neural network and a sentence decoder neural network utilizing an adversarial classifier. In particular, the adversarial auto-encoder training engine 702 can train a sentence encoder neural network and a sentence decoder neural network based on an adversarial loss and/or a reconstruction loss. To illustrate, the adversarial auto-encoder training engine 702 can utilize training sentences to train a sentence encoder neural network (to generate feature vectors in a semantic space from an input digital image) and train a sentence decoder neural network (to generate captions from feature vectors in the semantic space).

For example, as described above, the adversarial auto-encoder training engine 702 can access a batch of training sentences. The adversarial auto-encoder training engine 702 can utilize the sentence encoder neural network to generate a feature vector in a semantic space and utilize the sentence decoder neural network to generate a sentence from the feature vector. The adversarial auto-encoder training engine 702 can determine a reconstruction loss by comparing the generated sentence to the training sentence. Moreover, the adversarial auto-encoder training engine 702 can train the sentence encoder neural network and the sentence decoder neural network based on the reconstruction loss.

In addition to reconstruction loss, the adversarial auto-encoder training engine 702 can also train utilizing an adversarial loss. In particular, the adversarial auto-encoder training engine 702 can utilize an adversarial classifier to analyze the generated feature vector. Specifically, the adversarial auto-encoder training engine 702 can utilize an adversarial classifier to predict whether the generated feature corresponds to a positive class (i.e., a class of samples drawn from a known distribution) or a negative class (i.e., a class of samples generated by the sentence encoder neural network). The adversarial auto-encoder training engine 702 can generate an adversarial loss by comparing the predicted class with the actual class of the generated feature vector. Moreover, the adversarial auto-encoder training engine 702 can train the sentence encoder neural network and the adversarial classifier based on the determined adversarial loss.

As shown in FIG. 7, in addition to the adversarial auto-encoder training engine 702, the digital image captioning system 700 can also include the semantic similarity training engine 704. The semantic similarity training engine 704 can train, teach, or instruct an image encoder neural network (together with a sentence encoder neural network and/or a sentence decoder neural network) based on a semantic similarity constraint. To illustrate, the semantic similarity training engine 704 can access training images and corresponding training captions and train an image encoder neural network (to generate feature vectors from an input digital image), a sentence encoder neural network (to generate feature vectors from a sentence), and a sentence decoder neural network (to generate captions from a feature vector).

For example, as described above, the semantic similarity training engine 704 can utilize the image encoder neural network to predict image feature vectors from training images and utilize the sentence encoder neural network to predict caption feature vectors from the training captions. The semantic similarity training engine 704 can then apply a semantic similarity constraint (i.e., minimize a semantic similarity loss) across the caption feature vectors and the image feature vectors.

The semantic similarity training engine 704 can also train utilizing a reconstruction loss. For instance, the semantic similarity training engine 704 can utilize the image encoder neural network to predict image feature vectors from training images and the sentence decoder neural network to predict captions from the image feature vectors. The semantic similarity training engine 704 can then determine a reconstruction loss by comparing the predicted captions with the training captions. The semantic similarity training engine 704 can then train the image encoder neural network and the sentence decoder neural network based on the reconstruction loss.

As shown in FIG. 7, the digital image captioning system 700 also includes the caption generator 706. The caption generator 706 can identify, determine, generate, create, and/or provide one or more captions for an input digital image. In particular, as described above, the caption generator 706 can utilize a trained image encoder neural network to analyze an input digital image and generate a feature vector in a semantic space. The caption generator 706 can also utilize a trained sentence decoder neural network to generate a caption from the feature vector in the semantic space. The caption generator 706 can provide captions for presentation via a computing device (e.g., provide for display). The caption generator 706 can also utilize captions to label, search, or identify digital images.

Moreover, as illustrated in FIG. 7, the digital image captioning system 700 also includes the storage manager 708. The storage manager 708 maintains data to perform the functions of the digital image captioning system 700. As illustrated, the storage manager 708 includes the sentence encoder neural network 708a (e.g., a character-level convolutional neural network that generates feature vectors from a sentence), a sentence decoder neural network 708b (e.g., a character-level recurrent neural network that generates captions from feature vectors), an image encoder neural network 708c (e.g., a neural network that generates feature vectors from an input digital image), training sentences 708d (e.g., a repository of sentences, such as BookCorpus), training images and training captions 708e (a repository of training images and corresponding captions, such as MSCOCO), input digital images 708f (e.g., digital images received without captions), and captions 708g (e.g., captions generated for the input digital images 708f).

Each of the components 702-708 of the digital image captioning system 700 (as shown in FIG. 7) may be in communication with one another using any suitable communication technologies. It will be recognized that although components 702-708 of the digital image captioning system 700 are shown to be separate in FIG. 7, any of components 702-708 may be combined into fewer components, such as into a single facility or module, divided into more components, or configured into different components as may serve a particular embodiment.

The components 702-708 of the digital image captioning system 700 can comprise software, hardware, or both. For example, the components 702-708 can comprise one or more instructions stored on a computer-readable storage medium and executable by processors of one or more computing devices. When executed by the one or more processors, the computer-executable instructions of the digital image captioning system 700 can cause a client device and/or a server device to perform the methods described herein. Alternatively, the components 702-708 and their corresponding elements can comprise hardware, such as a special purpose processing device to perform a certain function or group of functions. Additionally, the components 702-708 can comprise a combination of computer-executable instructions and hardware.

Furthermore, the components 702-708 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-708 may be implemented as a stand-alone application, such as a desktop or mobile application. Furthermore, the components 702-708 may be implemented as one or more web-based applications hosted on a remote server. The components 702-708 may also be implemented in a suit of mobile device applications or "apps." To illustrate, the components 702-708 may be implemented in an application, including but not limited to ADOBE ACROBAT software, ADOBE EXPERIENCE MANAGER software, ADOBE STOCK software, ADOBE PHOTOSHOP software or ADOBE ILLUSTRATOR software. "ADOBE," "ACROBAT," "EXPERIENCE MANAGER," "STOCK," "PHOTOSHOP," and "ILLUSTRATOR," are either registered trademarks or trademarks of Adobe Systems Incorporated in the United States and/or other countries.

Figure 8:
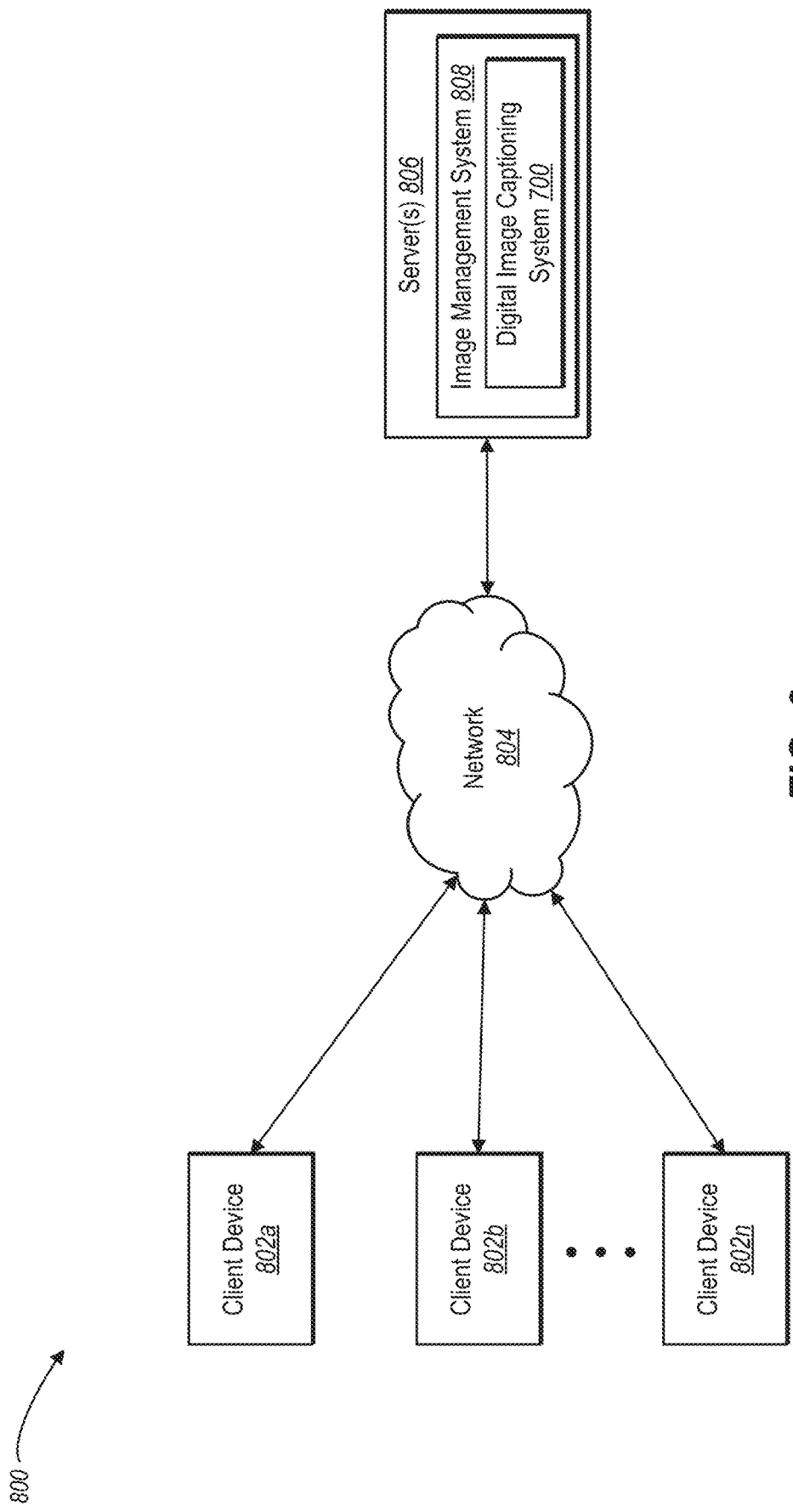
FIG. 8 illustrates a schematic diagram illustrating an exemplary environment in which the digital image caption system may be implemented in accordance with one or more embodiments.

FIG. 8 illustrates a schematic diagram of one embodiment of an exemplary environment 800 in which the digital image captioning system 700 can operate. In one or more embodiments, the exemplary environment 800 includes one or more client devices 802a, 802b, . . . 802n, a network 804, and server(s) 806. The network 804 may be any suitable network over which the computing devices can communicate. Example networks are discussed in more detail below with regard to FIG. 11.

As illustrated in FIG. 8, the environment 800 may include client devices 802a-802n. The client devices 802a-802n may comprise any computing device. For instance, in one or more embodiments, one or more of the client devices 802a-802n comprise one or more computing devices described below in relation to FIG. 11.

In addition, the environment 800 may also include the server(s) 806. The server(s) 806 may generate, store, receive, and transmit any type of data, including the sentence encoder neural network 708a, the sentence decoder neural network 708b, the image encoder neural network 708c, the training sentences 708d, the training images and training captions 708e, the input digital images 708f, and the captions 708g. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 11.

As shown in FIG. 8, the server(s) can include an image management system 808. The image management system 808 can include an implementation of software, hardware, or both for managing one or more digital images. For example, in one or more embodiments, the image management system 808 comprises software (such as ADOBE STOCK software) that maintains, manages, and/or provides a repository of digital images for utilization by a plurality of client devices. Similarly, in one or more embodiments, the image management system 808 comprises software that manages digital images captured by a client device and stored at the server(s) 806.

As illustrated, in one or more embodiments, the server(s) 806 (and/or the image management system 808) can include all, or a portion of, the digital image captioning system 700. In particular, the digital image captioning system 700 can comprise an application running on the server(s) 806 (as part of the image management system 808) or a portion of a software application that can be downloaded from the server(s) 806. For example, the digital image captioning system 700 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, and the server(s) 806, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the digital image captioning system 700 can be implemented on a single computing device. In particular, the digital image captioning system 700 may be implemented in whole by the client device 802a or the digital image captioning system 700 may be implemented in whole by the server(s) 806. Alternatively, the digital image captioning system 700 may be implemented across multiple devices or components (e.g., utilizing the client devices 802a-802n and the server(s) 806).

By way of example, in one or more embodiments, the server(s) 806 access a plurality of training sentences and a plurality of training images with corresponding training captions. The server(s) 806 utilize the training sentences to train a sentence encoder neural network and a sentence decoder neural network utilizing an adversarial classifier and the training sentences. Moreover, the server(s) 806 training an image encoder neural network, the sentence encoder neural network, and the sentence decoder neural network utilizing a semantic similarity constraint, the training images, and the corresponding training captions. Upon training the image encoder neural network and the sentence decoder neural network, the server(s) 806 receive from the client device 802a a request for a caption for an input digital image (e.g., an input digital image managed by the image management system 808). The server(s) 806 utilize the image encoder neural network to generate a feature vector of the input digital image in a semantic space. The server(s) 806 also utilize the sentence decoder neural network to generate a caption for the input digital image from the feature vector in the semantic space. The server(s) 806 then provide the generated caption to the client device 802a.

Figure 9:
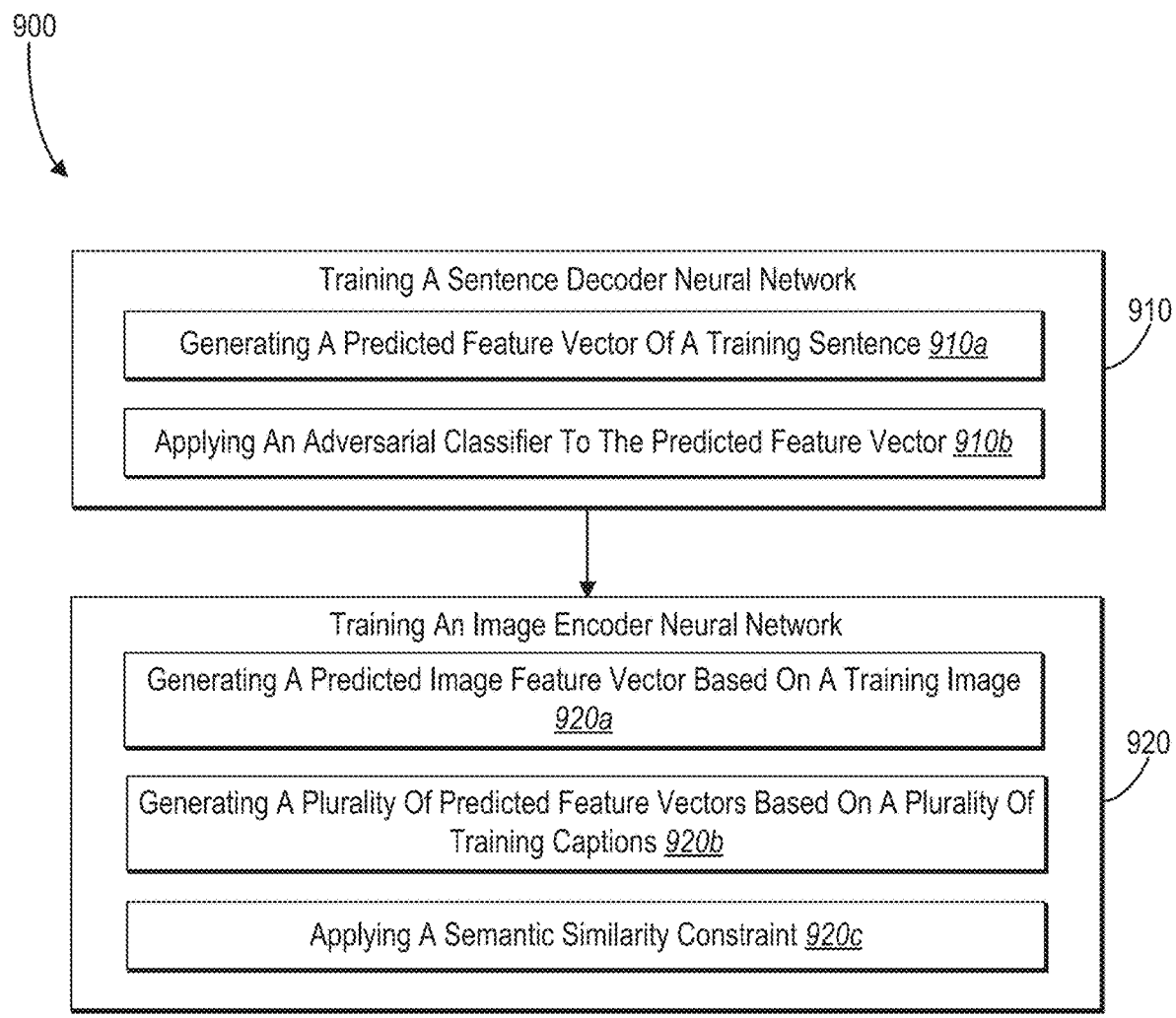
FIG. 9 illustrates a flowchart of a series of acts in a method of training a digital model to generate captions reflecting digital image contents in accordance with one or more embodiments.
Figure 10:
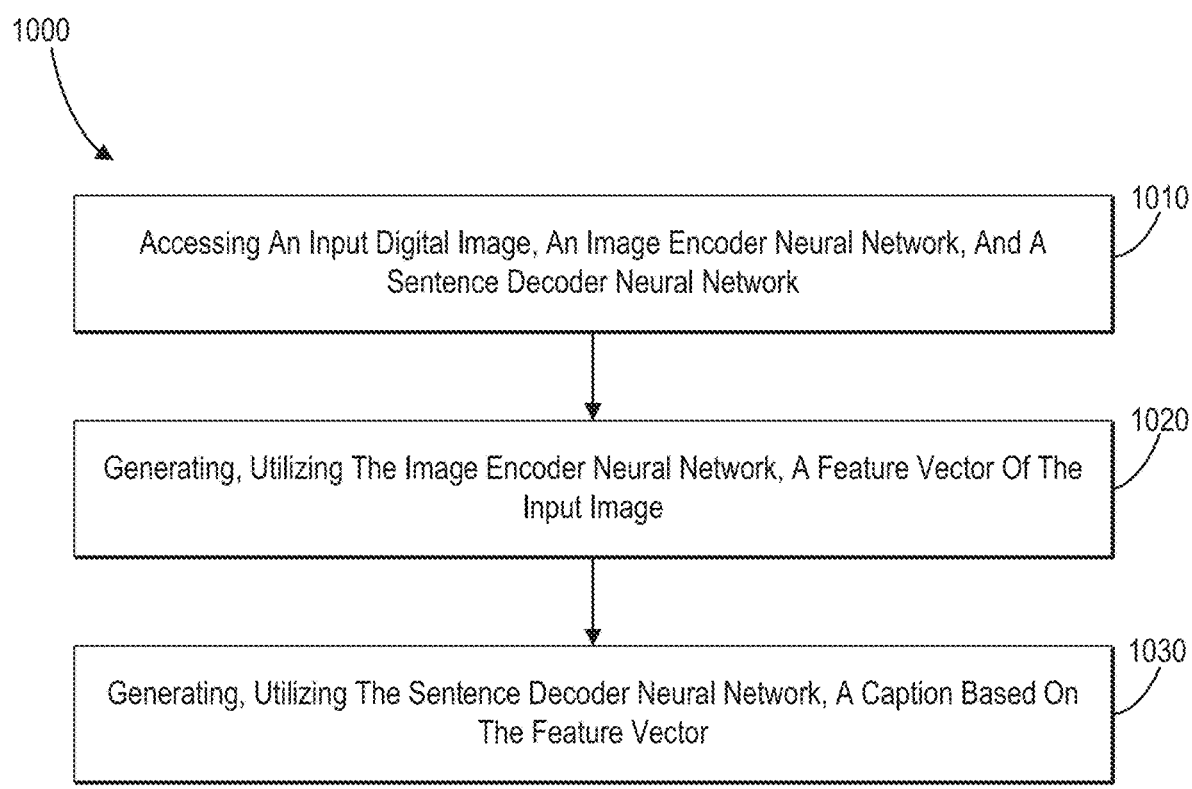
FIG. 10 illustrates a flowchart of a series of acts in a method of training a digital model to generate captions reflecting digital image contents in accordance with one or more embodiments.

FIGS. 1-8, the corresponding text, and the examples, provide a number of different systems and devices for rendering digital images of a virtual environment utilizing full path space learning. In addition to the foregoing, embodiments can also be described in terms of flowcharts comprising acts in a method for accomplishing a particular result. For example, FIGS. 9-10 illustrate flowcharts of exemplary methods in accordance with one or more embodiments. The methods described in relation to FIGS. 9-10 may be performed with less or more acts or the acts may be performed in differing orders. Additionally, the acts described herein may be repeated or performed in parallel with one another or in parallel with different instances of the same or similar steps/acts.

FIG. 9 illustrates a flowchart of a series of acts in a method 900 of training a digital model to generate captions reflecting digital image contents. In one or more embodiments, the method 900 is performed in a digital medium environment that includes the digital image captioning system 700. The method 900 is intended to be illustrative of one or more methods in accordance with the present disclosure, and is not intended to limit potential embodiments. Alternative embodiments can include additional, fewer, or different steps than those articulated in FIGS. 9-10.

As illustrated in FIG. 9, the method 900 includes an act 910 of training a sentence encoder neural network. More particularly, as shown, the act 910 can include the act 910a of generating a predicted feature vector of a training sentence and the act 910b of applying an adversarial classifier to the predicted feature vector.

More specifically, in one or more embodiments, the act 910a includes generating, utilizing the sentence encoder neural network, a predicted feature vector of a training sentence in a semantic space. For example, the sentence encoder network can include a character-level convolutional neural network.

Moreover, as mentioned above, the act 910 also includes the act 910b of applying an adversarial classifier to the predicted feature vector. In particular, the act 910b can include applying an adversarial classifier to the predicted feature vector to constrain the sentence encoder neural network to regions of the semantic space that can be decoded to viable sentences. For example, in one or more embodiments, the act 910 can include predicting, utilizing the adversarial classifier, a first classification of the predicted feature vector, wherein the predicted feature vector corresponds to a negative class; generating an adversarial classification loss by comparing the first predicted classification with the negative class; and training the sentence encoder neural network based on the adversarial classification loss.

In addition, the act 910a can also include predicting, utilizing the adversarial classifier, a second classification of a training representation from a prior distribution, wherein the training representation corresponds to a positive class. For instance, in one or more embodiments, generating the adversarial classification loss comprises comparing the second predicted classification with the positive class.

Furthermore, in one or more embodiments, the act 910 also includes generating, utilizing a sentence decoder neural network, a predicted caption from the predicted feature vector in the semantic space; determining a reconstruction loss by comparing the predicted caption with the training sentence; and training the sentence encoder neural network and the sentence decoder neural network based on the reconstruction loss. For instance, in one or more embodiments, the sentence decoder neural network comprises at least one of: a character-level convolutional neural network or a character-level recurrent neural network.

In addition, as shown in FIG. 9, the method 900 can also include the act 920 of training an image encoder neural network. As illustrated, the act 920 can include the act 920a of generating a predicted image feature vector based on a training image, the act 920b of generating a plurality of predicted feature vectors based on a plurality of training captions, and the act 920c of applying a semantic similarity constraint.

More specifically, in one or more embodiments, the act 920a includes generating, utilizing the image encoder neural network, a predicted image feature vector in the semantic space from a training image, wherein the training image corresponds to a plurality of training captions. Indeed, in one or more embodiments, each training image corresponds to at least three training captions.

Moreover, as mentioned above, the act 920 can also include the act 920b of generating a plurality of predicted feature vectors based on a plurality of training captions. In particular, in one or more embodiments, the act 920b includes generating, utilizing the sentence encoder neural network, a plurality of predicted feature vectors based on the plurality of training captions In addition, as shown in FIG. 9, the act 920 can also include the act 920c of applying a semantic similarity constraint. In particular, the act 920c can include applying a semantic similarity constraint by comparing the plurality of predicted feature vectors based on the plurality of training captions with the predicted image feature vector.

In one or more embodiments, the act 920 also includes jointly training the image neural network, the sentence encoder neural network, and the sentence decoder neural network. For instance, the act 920 can include determining a semantic similarity loss based on the comparison between the plurality of predicted feature vectors and the predicted image feature vector; generating, utilizing the sentence decoder neural network, a predicted caption corresponding to a training caption of the plurality of training captions; determining a reconstruction loss by comparing the predicted caption and the training caption; training the image encoder neural network and the sentence encoder neural network based on the semantic similarity loss; and training the sentence encoder neural network and the sentence decoder neural network based on the reconstruction loss.

Furthermore, in one or more embodiments, the method 900 also includes utilizing the sentence decoder neural network and the image encoder neural network to generate a caption for an input digital image. Moreover, the method 900 can also include initially training the sentence encoder neural network utilizing a plurality of training sentences and then alternating between training the sentence encoder neural network with additional training sentences and the image encoder neural network with additional training images corresponding to additional training captions.

FIG. 10 illustrates a flowchart of a series of acts in a method 1000 of generating captions reflecting digital image contents. As shown, the method 1000 includes an act 1010 of accessing an input digital image, an image encoder neural network, and an image decoder neural network. In particular, the act 1010 can comprise accessing an image encoder neural network trained to generate, from digital images, feature vectors in a semantic space, wherein the image encoder neural network is trained utilizing training images and corresponding training captions. For instance, in one or more embodiments, the image encoder neural network is trained by applying a semantic similarity constraint, wherein applying a semantic similarity constraint comprises comparing feature vectors generated by the sentence encoder neural network from the training captions with feature vectors of the training images generated by the image encoder neural network.

Moreover, the act 1010 can also include accessing a sentence decoder neural network trained to generate sentences from generated feature vectors in the semantic space, wherein the sentence decoder neural network is trained utilizing an adversarial classifier and a plurality of training sentences. For instance, in one or more embodiments, the sentence decoder neural network is trained together with the image encoder neural network based on the training images and the corresponding training captions. Furthermore, in one or more embodiments, the act 1010 also includes accessing a sentence encoder neural network trained to generate feature vectors from training sentences.

In addition, as illustrated in FIG. 10, the method 1000 also includes an act 1020 of generating, utilizing the image encoder neural network, a feature vector of the input image. In particular, the act 1020 can include generating, utilizing the image encoder neural network, a feature vector of an input digital image in the semantic space. For example, in one or more embodiments, the feature vector in the semantic space encapsulates a semantic meaning of the input digital image.

As shown in FIG. 10, the method 1000 also includes an act 1030 of generating, utilizing the sentence decoder neural network, a caption based on the feature vector. In particular, the act 1030 can include generating, utilizing the sentence decoder neural network, a caption for the input digital image based on the feature vector.

Moreover, in one or more embodiments, the method 1000 also includes providing the generated caption for presentation to a user together with the input digital image. For instance, the method 1000 can include providing the generated caption for display, providing the caption audibly, or providing the generated caption for display with the input digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
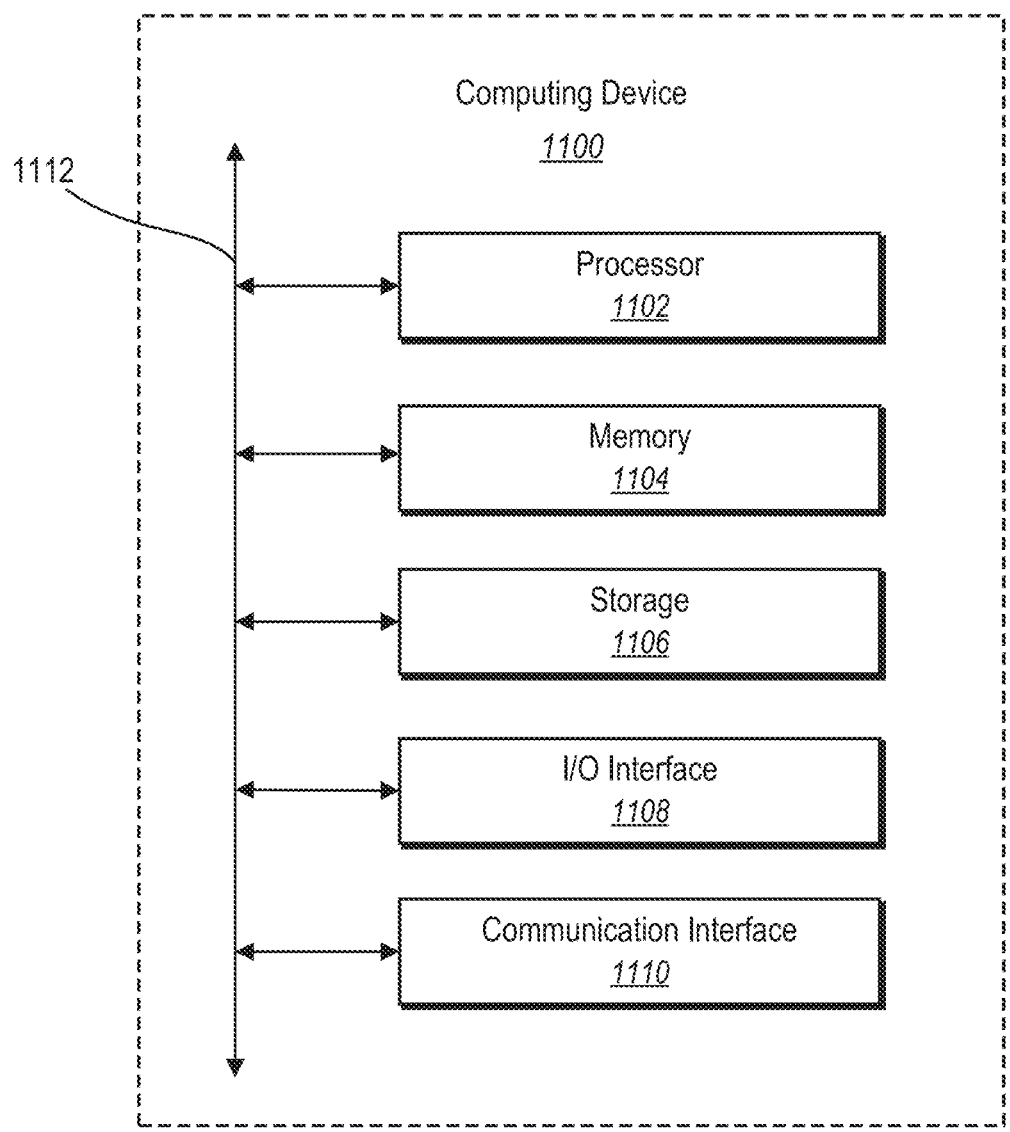
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the digital image captioning system 700 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable storage medium having stored thereon computer-executable instructions that, when executed by at least one processor, cause a computing device to:
    train a sentence encoder neural network utilizing an adversarial classifier by:
        generating, utilizing the sentence encoder neural network, a predicted feature vector of a training sentence in a semantic space; and
        applying the adversarial classifier to the predicted feature vector to constrain the sentence encoder neural network to a region of the semantic space that can be decoded to viable sentences; and
    training an image encoder neural network and the sentence encoder neural network utilizing a semantic similarity constraint by:
        generating, utilizing the image encoder neural network, a predicted image feature vector in the semantic space from a training image, wherein the training image corresponds to a plurality of training captions;
        generating, utilizing the sentence encoder neural network, a plurality of predicted caption feature vectors in the semantic space based on the plurality of training captions; and
        applying the semantic similarity constraint by:
            comparing the plurality of predicted caption feature vectors with the predicted image feature vector within the semantic space to determine a semantic similarity loss representing a difference in semantic meaning between the plurality of predicted caption feature vectors and the predicted image feature vector; and
            modifying parameters of the image encoder neural network and the sentence encoder neural network based on the semantic similarity loss.

2. The non-transitory computer-readable storage medium of claim 1, further comprising instructions that, when executed by the at least one processor, cause the computing device to utilize the image encoder neural network to generate a feature vector for an input digital image.

3. The non-transitory computer-readable storage medium of claim 2, further comprising instructions that, when executed by the at least one processor, cause the computing device to utilize a sentence decoder neural network to generate a caption from the feature vector for the input digital image.

4. The non-transitory computer-readable storage medium of claim 1, wherein the training image corresponds to at least three training captions.

5. The non-transitory computer-readable storage medium of claim 3, further comprising instructions that, when executed by the at least one processor, cause the computing device to:
    determine a reconstruction loss by comparing the caption generated by the sentence decoder neural network by comparing the caption with a training sentence associated with the input digital image; and
    train the sentence encoder neural network and the sentence decoder neural network based on the reconstruction loss.

6. The non-transitory computer-readable storage medium of claim 1, further comprising instructions that, when executed by the at least one processor, cause the computing device to:

repeatedly train the sentence encoder neural network; and
after repeatedly training the sentence encoder neural network, alternate between training the image encoder neural network and training the sentence encoder neural network.

7. A system for generating captions reflecting digital image contents, comprising:
one or more memories, comprising:
an image encoder neural network; and
a sentence encoder neural network;
at least one computing device storing instructions thereon, that, when executed by the at least one computing device, cause the system to:
train the sentence encoder neural network utilizing an adversarial classifier and a reconstruction loss by:
generating, utilizing the sentence encoder neural network, a predicted feature vector of a training sentence in a semantic space;
applying the adversarial classifier to the predicted feature vector to constrain the sentence encoder neural network to regions of the semantic space that can be decoded to viable sentences; and
train the image encoder neural network and the sentence encoder neural network utilizing a semantic similarity constraint by:
generating, utilizing the image encoder neural network, a predicted image feature vector in the semantic space from a training image, wherein the training image corresponds to a plurality of training captions;
generating, utilizing the sentence encoder neural network, a plurality of predicted caption feature vectors in the semantic space based on the plurality of training captions; and
applying the semantic similarity constraint by:
comparing the plurality of predicted caption feature vectors based on the plurality of training captions with the predicted image feature vector within the semantic space to determine a semantic similarity loss representing a difference in semantic meaning between the plurality of predicted caption feature vectors and the predicted image feature vector; and
modifying parameters of the image encoder neural network and the sentence encoder neural network based on the semantic similarity loss.

8. The system of claim 7, further storing instructions thereon that, when executed by the at least one computing device, cause the system to generate, utilizing the trained image encoder neural network, a feature vector of an input digital image in the semantic space.

9. The system of claim 8, further storing instructions thereon, that, when executed by the at least one computing device, cause the system to generate, utilizing a sentence decoder neural network, a caption for the input digital image based on the feature vector.

10. The system of claim 9, further storing instructions thereon, that when executed by the at least one computing device, cause the system to provide the generated caption for the input digital image for presentation to a user together with the input digital image.

11. The system of claim 7, wherein applying the adversarial classifier comprises:
predicting, utilizing the adversarial classifier, a first classification of the predicted feature vector, wherein the predicted feature vector corresponds to a negative class;
generating an adversarial classification loss by comparing the first predicted classification with the negative class; and
training the sentence encoder neural network based on the adversarial classification loss.

12. A computer-implemented method for training a digital model to generate captions reflecting digital image contents, comprising:
training a sentence encoder neural network utilizing an adversarial classifier by:
generating, utilizing the sentence encoder neural network, a predicted feature vector of a training sentence in a semantic space; and
applying the adversarial classifier to the predicted feature vector to constrain the sentence encoder neural network to regions of the semantic space that can be decoded to viable sentences; and
training an image encoder neural network and the sentence encoder neural network utilizing a semantic similarity constraint by:
generating, utilizing the image encoder neural network, a predicted image feature vector in the semantic space from a training image, wherein the training image corresponds to a plurality of training captions;
generating, utilizing the sentence encoder neural network, a plurality of predicted caption feature vectors in the semantic space based on the plurality of training captions; and
applying the semantic similarity constraint by:
comparing the plurality of predicted caption feature vectors based on the plurality of training captions with the predicted image feature vector within the semantic space to determine a semantic similarity loss representing a difference in semantic meaning between the plurality of predicted caption feature vectors and the predicted image feature vector; and
modifying parameters of the image encoder neural network and the sentence encoder neural network based on the semantic similarity loss.

13. The method of claim 12, wherein training the sentence encoder neural network utilizing the adversarial classifier further comprises:
generating, utilizing a sentence decoder neural network, a predicted caption from the predicted feature vector in the semantic space;
determining a first reconstruction loss by comparing the predicted caption with the training sentence; and
training the sentence encoder neural network and the sentence decoder neural network based on the first reconstruction loss.

14. The method of claim 13, further comprising utilizing the sentence decoder neural network and the image encoder neural network to generate a caption for an input digital image.

15. The method of claim 12, wherein applying the adversarial classifier comprises:
predicting, utilizing the adversarial classifier, a first classification of the predicted feature vector, wherein the predicted feature vector corresponds to a negative class;
generating an adversarial classification loss by comparing the first predicted classification with the negative class; and
training the sentence encoder neural network based on the adversarial classification loss.

16. The method of claim 15, further comprising predicting, utilizing the adversarial classifier, a second classification of a training representation from a prior distribution, wherein the training representation corresponds to a positive class; and wherein generating the adversarial classification loss comprises comparing the second predicted classification with the positive class.

17. The method of claim 13, wherein:

the sentence encoder network comprises a character-level convolutional neural network; and the decoder neural network comprises at least one of: a character-level convolutional neural network or a character-level recurrent neural network.

18. The method of claim 13, wherein training the image encoder neural network and the sentence encoder neural network utilizing the semantic similarity constraint further comprises jointly training the image neural network, the sentence encoder neural network, and the sentence decoder neural network by:

generating, utilizing the sentence decoder neural network, a predicted caption corresponding to a training caption of the plurality of training captions;

determining a second reconstruction loss by comparing the predicted caption and the training caption; and modifying parameters of the sentence encoder neural network and the sentence decoder neural network based on the second reconstruction loss.

19. The method of claim 13, wherein:

training the sentence encoder neural network comprises initially training the sentence encoder neural network utilizing a plurality of training sentences; and training the image encoder neural network and the sentence encoder neural network comprises alternating between training the sentence encoder neural network with additional training sentences and the image encoder neural network with additional training images corresponding to additional training captions.

20. The method of claim 12, wherein training the image encoder neural network and the sentence encoder neural network utilizing the semantic similarity constraint is upon training the sentence encoder neural network utilizing the adversarial classifier.

* * * * *